United States Patent
Han et al.

(10) Patent No.: US 11,384,456 B2
(45) Date of Patent: Jul. 12, 2022

(54) METHOD TO PRODUCE MICRO AND NANOFIBERS WITH CONTROLLED DIAMETER AND LARGE YIELD

(71) Applicant: DREXEL UNIVERSITY, Philadelphia, PA (US)

(72) Inventors: Li-Hsin Han, Wynnewood, PA (US); Mingkun Wang, Philadelphia, PA (US); Chunxiao Cui, Philadelphia, PA (US); Alisa Morss Clyne, Ardmore, PA (US); Momtaz Alhindi, Horsham, PA (US); Jeffrey Krystek, Newtown, PA (US); Victor Micucci, Riverside, NJ (US); Evan Ostrow, Penllyn, PA (US); Sabah Shafi, Turnersville, NJ (US); Lin Han, Philadelphia, PA (US); Lanziye He, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 18 days.

(21) Appl. No.: 17/085,508

(22) Filed: Oct. 30, 2020

(65) Prior Publication Data
US 2021/0047758 A1 Feb. 18, 2021

Related U.S. Application Data

(62) Division of application No. 15/816,639, filed on Nov. 17, 2017, now Pat. No. 10,837,131.
(Continued)

(51) Int. Cl.
*D02J 1/22* (2006.01)
*D01D 5/12* (2006.01)
(Continued)

(52) U.S. Cl.
CPC ............. *D02J 1/228* (2013.01); *B29C 53/04* (2013.01); *B29C 53/08* (2013.01); *D01D 5/00* (2013.01);
(Continued)

(58) Field of Classification Search
CPC ....... B29C 53/08; B29C 53/083; B29C 53/10; B29C 53/04; D02J 1/22–229;
(Continued)

(56) References Cited

U.S. PATENT DOCUMENTS

| 1,738,796 A | 12/1929 | Reynolds |
| 3,503,106 A | 3/1970 | Port et al. |

(Continued)

FOREIGN PATENT DOCUMENTS

WO 2016129467 A1 8/2016

OTHER PUBLICATIONS

Han, et al., "Microribbon-based hydrogels accelerate stem cell-based bone regeneration in a mouse critical-size cranial defect model", J Biomed Mater Res A. 104(6), Jun. 2016, 1321-1331.

*Primary Examiner* — Jeffrey M Wollschlager
(74) *Attorney, Agent, or Firm* — Saul Ewing Arnstein & Lehr LLP; Kathryn Doyle; Brian R. Landry

(57) ABSTRACT

In one embodiment, the present invention is a method for producing microfibers comprising the steps of: (a) providing a base material; (b) forming the base material in a ring; (c) gripping opposing ends of the ring; (d) flipping one of the opposing ends relative to the other of the opposing ends, forming an upper portion and a lower portion; (e) folding the upper portion onto the lower portion; (f) stretching the folded upper and lower portions; and (g) repeating steps (d)-(f) as desired.

12 Claims, 30 Drawing Sheets

Related U.S. Application Data

(60) Provisional application No. 62/423,249, filed on Nov. 17, 2016.

(51) Int. Cl.
*D01F 11/04* (2006.01)
*D01F 8/04* (2006.01)
*D01D 5/00* (2006.01)
*B29C 53/04* (2006.01)
*B29C 53/08* (2006.01)
*B82Y 40/00* (2011.01)
*D01F 4/00* (2006.01)

(52) U.S. Cl.
CPC .................. *D01D 5/12* (2013.01); *D01F 8/04* (2013.01); *D01F 11/04* (2013.01); *D02J 1/22* (2013.01); *B82Y 40/00* (2013.01); *D01F 4/00* (2013.01)

(58) Field of Classification Search
CPC .... D01D 5/00; D01D 5/12; D01F 8/04; D01F 11/04; D01F 4/00; B82Y 40/00
See application file for complete search history.

(56) References Cited

U.S. PATENT DOCUMENTS

| | | |
|---|---|---|
| 3,985,599 A | 10/1976 | Lepoutre et al. |
| 4,717,520 A | 1/1988 | Angella et al. |
| 7,288,871 B1 | 10/2007 | Lu et al. |
| 2002/0002399 A1 | 1/2002 | Huxel et al. |
| 2005/0213904 A1 | 9/2005 | Hyvarinen et al. |
| 2007/0104444 A1 | 5/2007 | Suzuki et al. |
| 2010/0181696 A1 | 7/2010 | Glauner et al. |
| 2011/0039084 A1 | 2/2011 | Maki et al. |
| 2015/0064142 A1 | 3/2015 | Green et al. |
| 2016/0184141 A1 | 6/2016 | Zelka |
| 2018/0030622 A1 | 2/2018 | Masuda et al. |
| 2018/0050484 A1 | 2/2018 | Rocha |
| 2018/0083260 A1 | 3/2018 | Jiang et al. |

Core #: n = 1
Diameter d = $D_0$

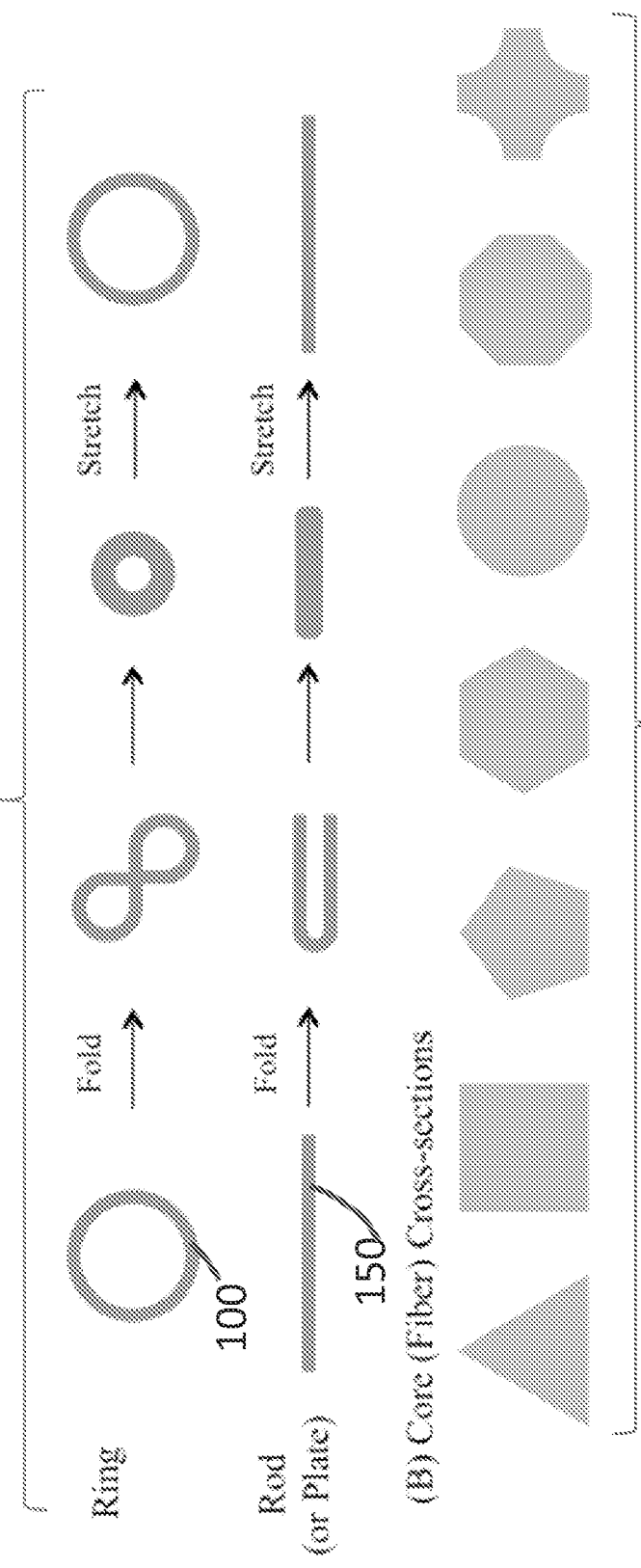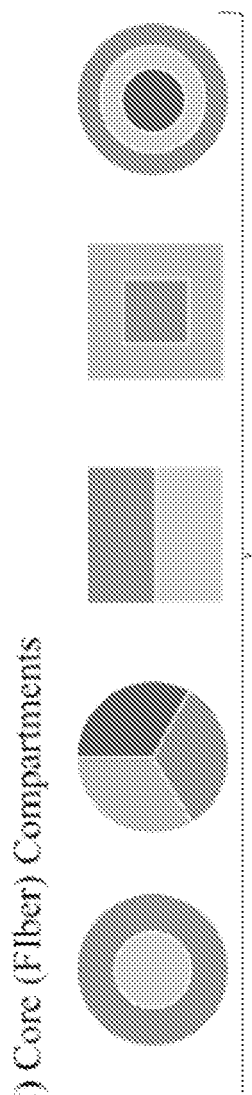
FIG. 7A
FIG. 7B
FIG. 7C

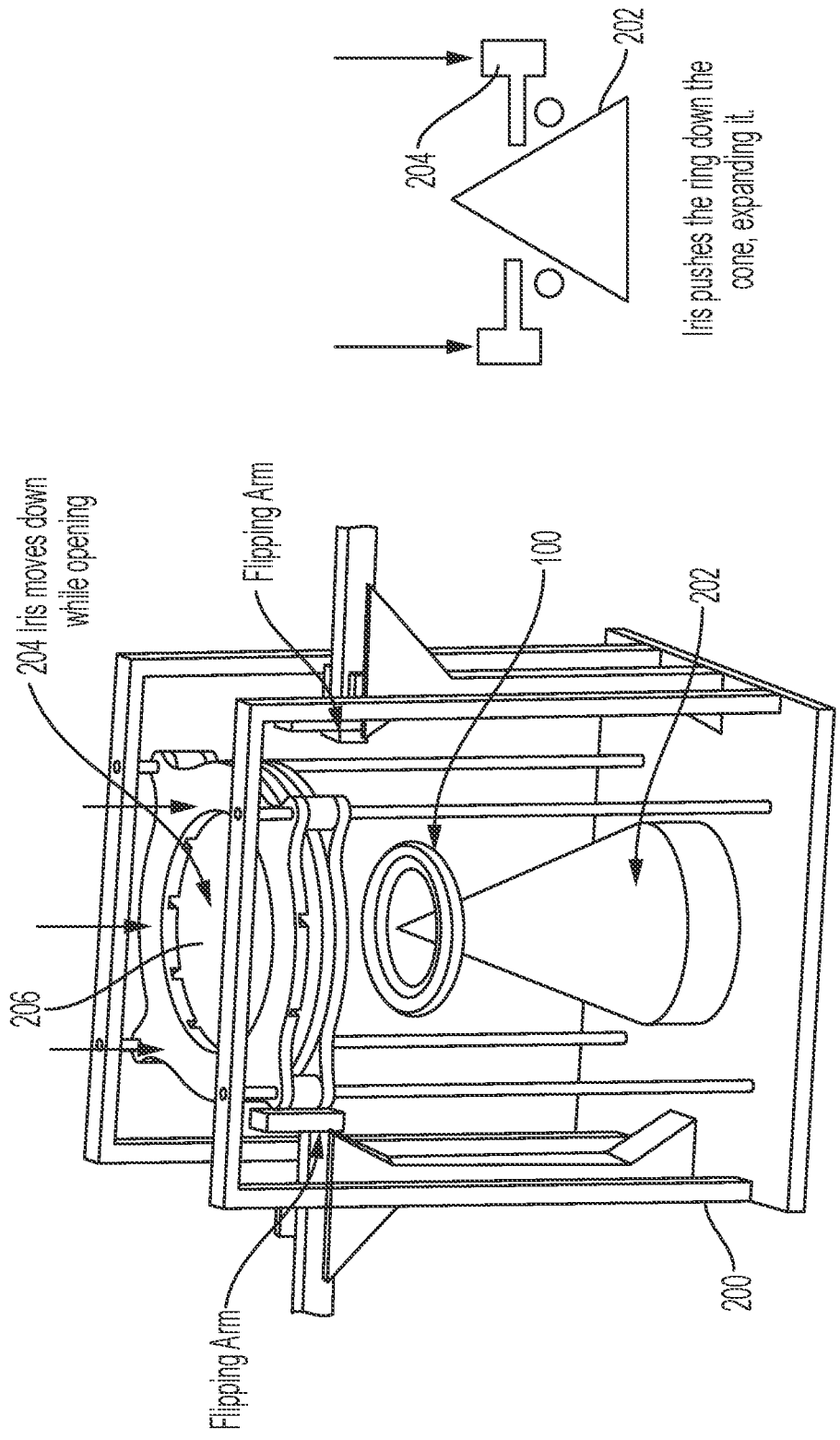

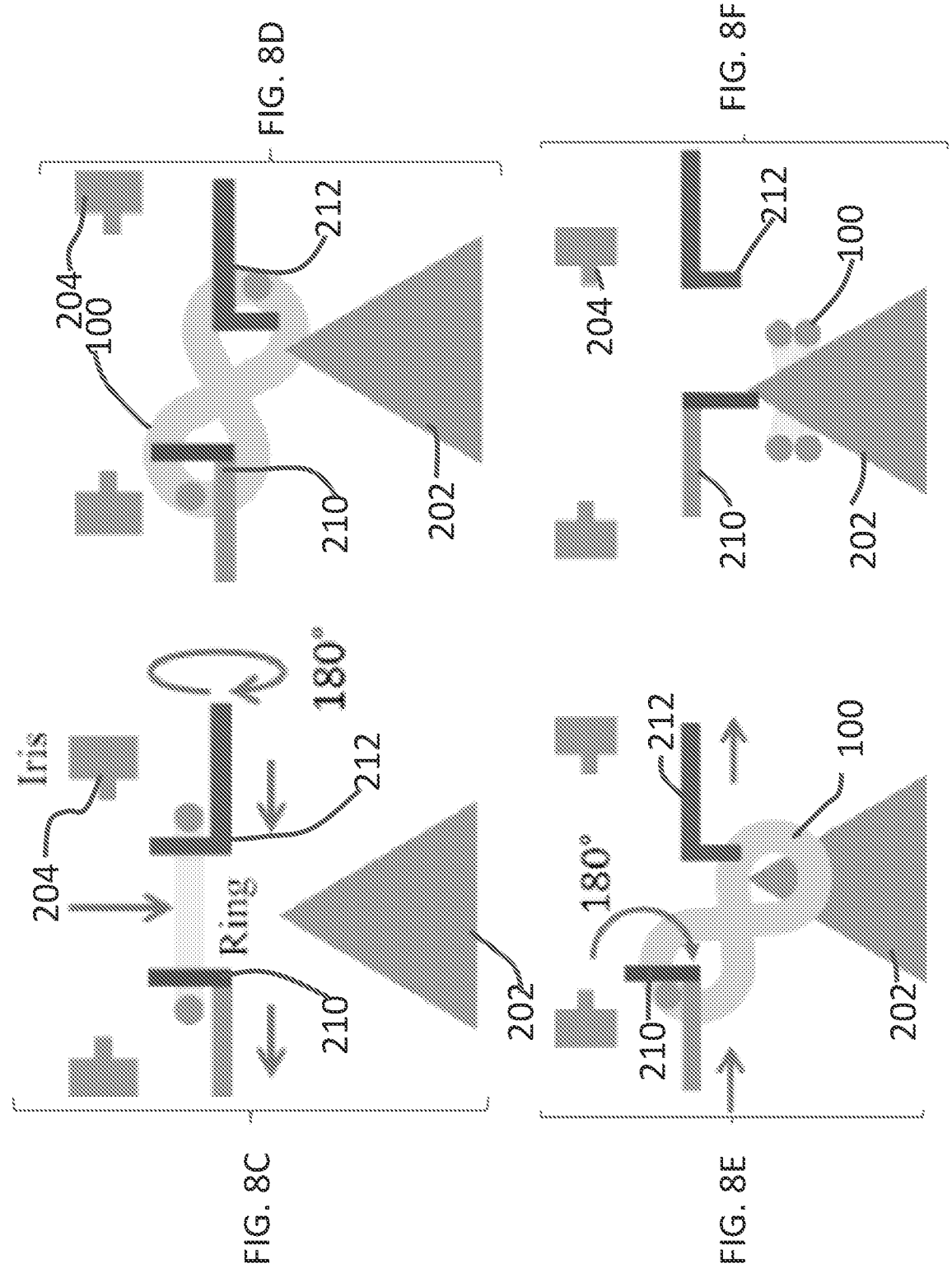

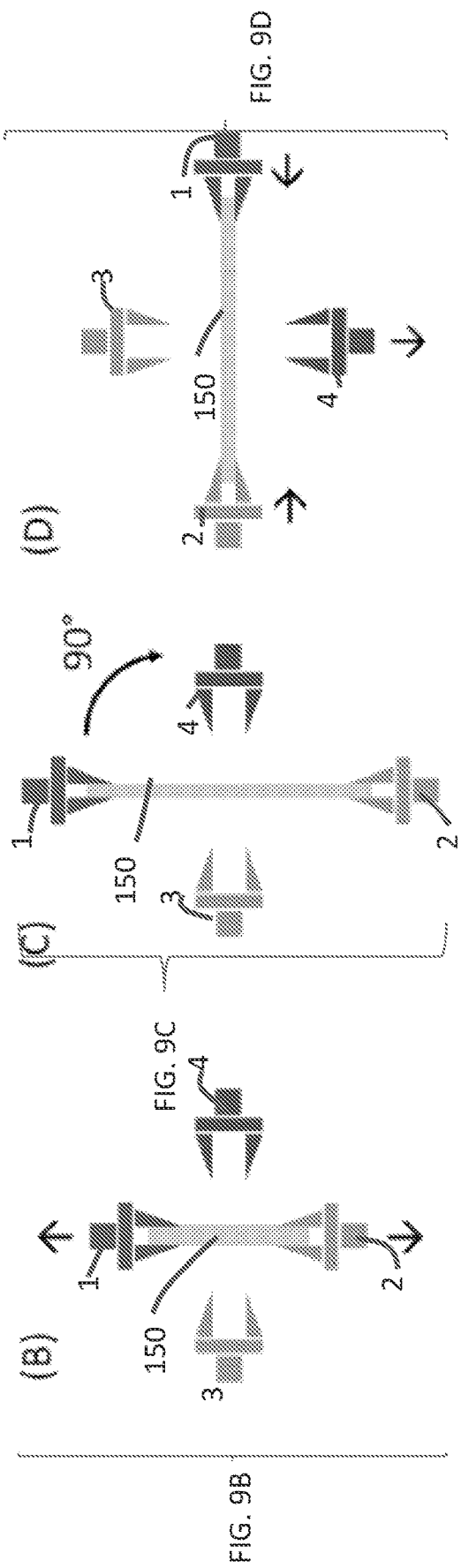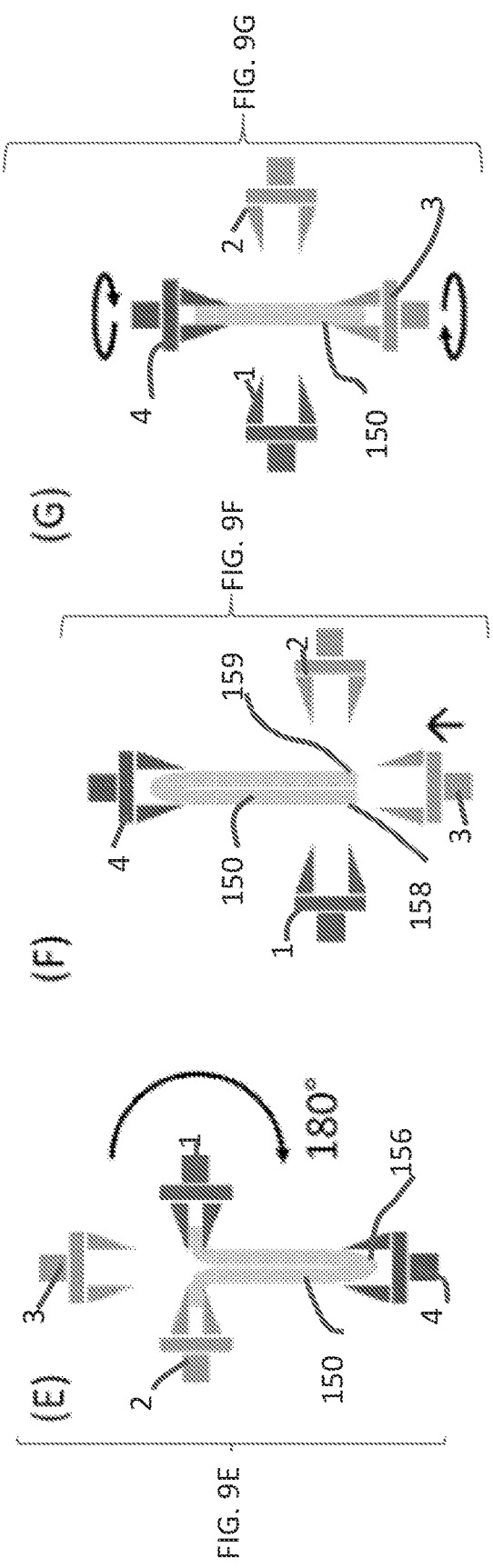

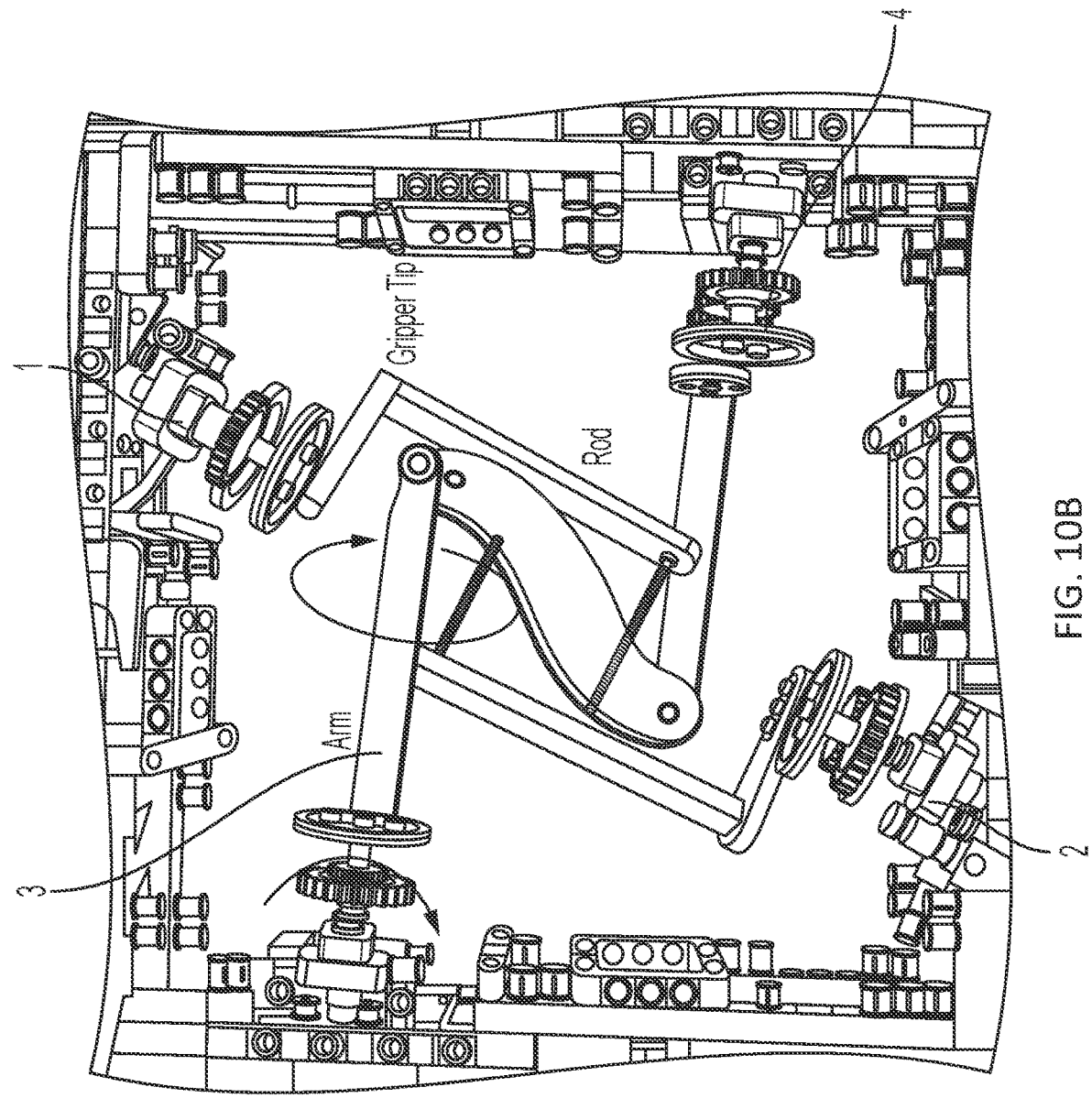

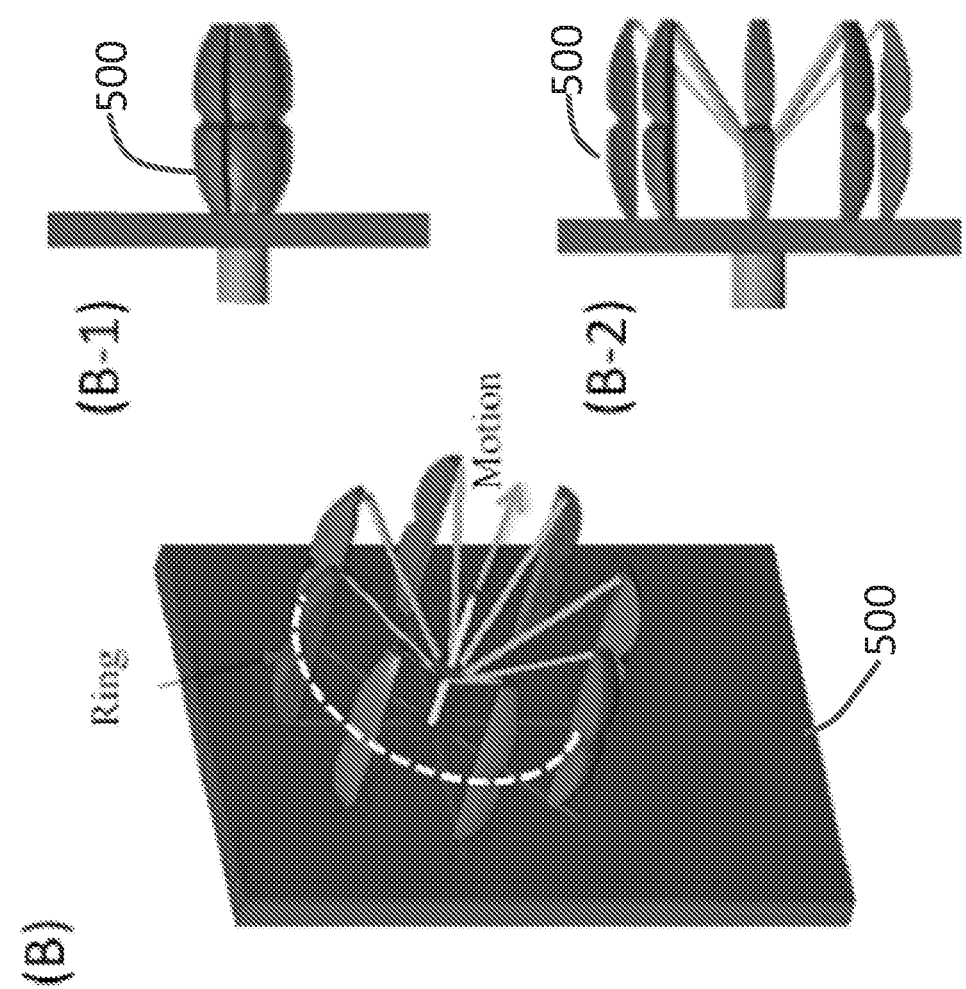

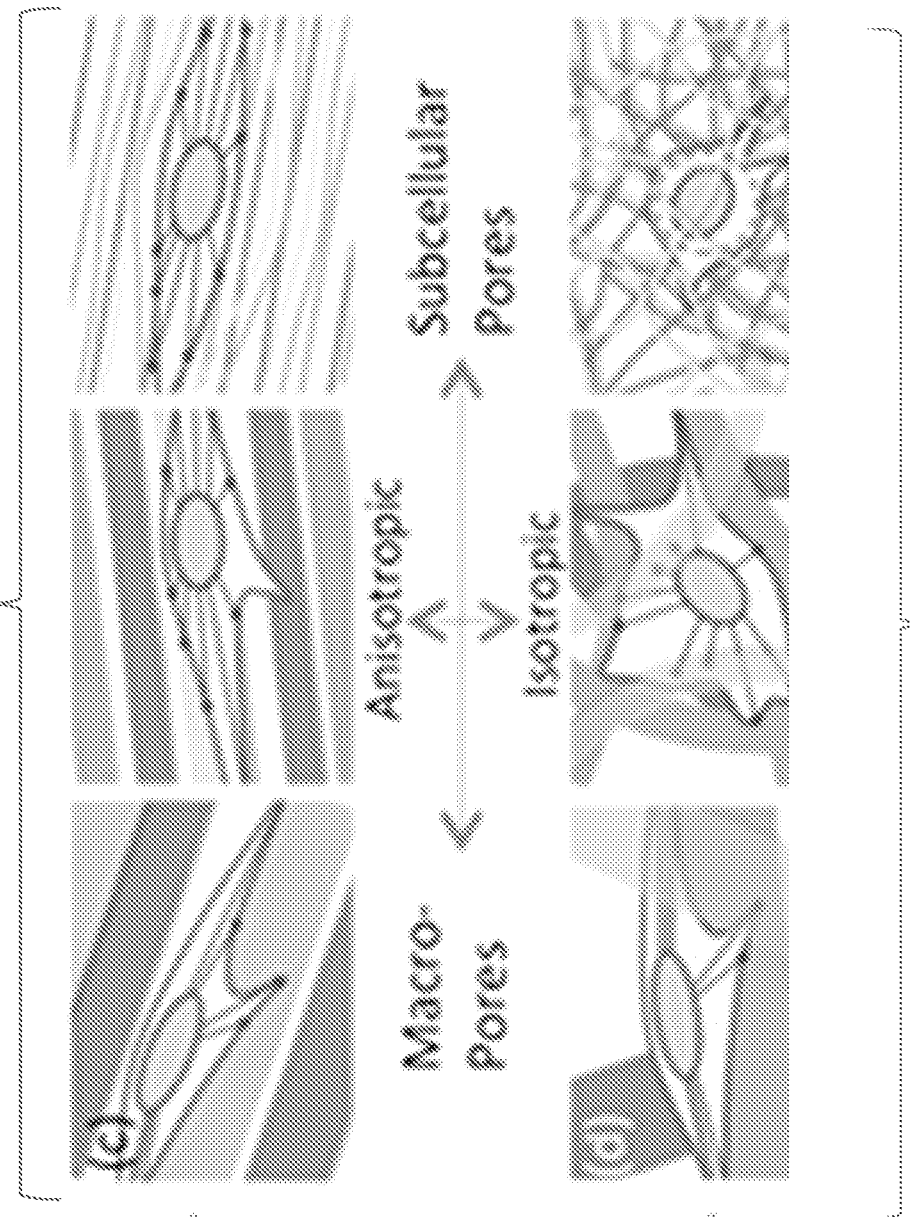
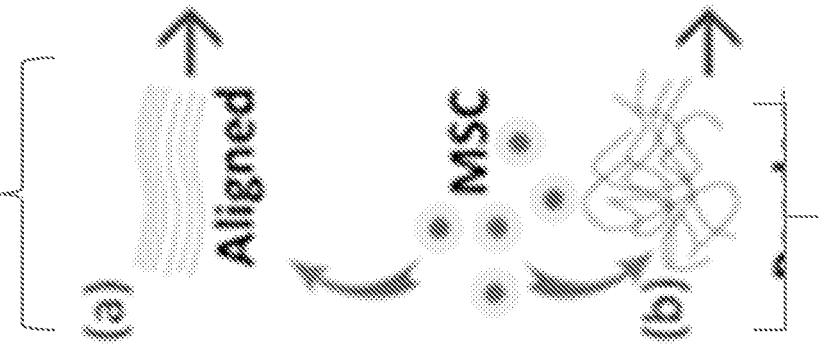
FIG. 14A  FIG. 14B  FIG. 14C  FIG. 14D

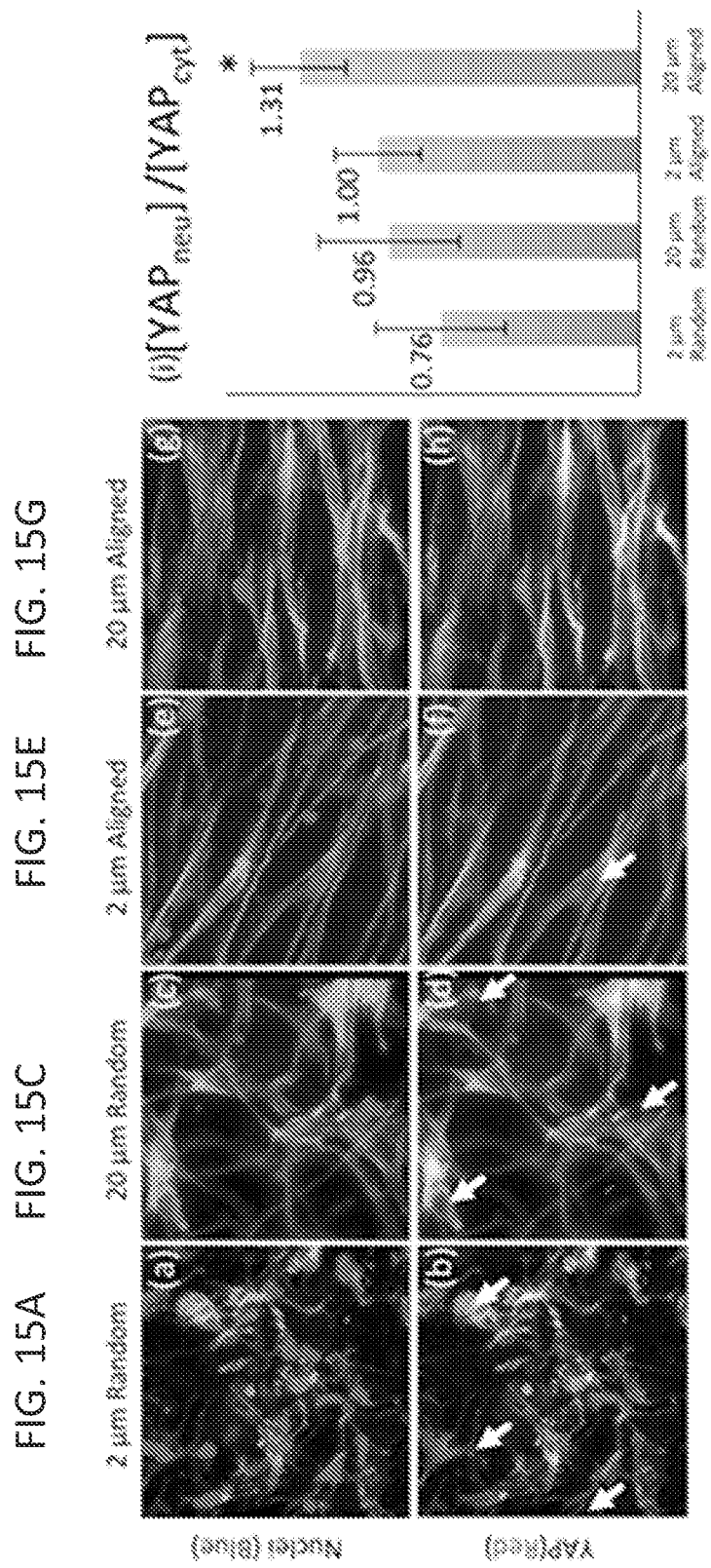

METHOD TO PRODUCE MICRO AND NANOFIBERS WITH CONTROLLED DIAMETER AND LARGE YIELD

CROSS-REFERENCE TO RELATED APPLICATIONS

This application is a divisional under 35 U.S.C. § 121 of U.S. patent application Ser. No. 15/816,639, filed Nov. 17, 2017, which claims the benefit of priority under 35 U.S.C. § 119(e) to U.S. Provisional Patent Application Ser. No. 62/423,249, filed Nov. 17, 2016. The entire content of each application is hereby incorporated by reference herein.

BACKGROUND OF THE INVENTION

Micro- and nanofibers have broad applications in the industry, spanning from traditional products, such as fabrics and textiles, to emerging products including biomedical materials, photovoltaic transducers and fuel cells. Application of micro- and nanofibers to non-woven fabrics alone produces $38 billion annual revenues, and is supporting more than 160,000 jobs in the United States. The consumption of micro/nanofibers in the biomedical industry exceeded 30 metric tons in the year of 2012; this created a $24 million global market in 2012, and the market value is projected to exceed $155 million by 2018 following a 36.8% compound annual growth rate (CAGR). The global revenue of all products based on micro- and nanofibers manufacturing is estimated to exceed $1 billion by 2020. Micro- and nanofibers are used in medicine for artificial organ components, tissue engineering, implant material, drug delivery, wound dressing, and medical textile materials; in the military for bullet proof vests, sound absorption materials, infrared light absorbing textiles, protective clothing against chemical and biological warfare agents, and sensor applications for detecting chemical agents; in the textile industry for sport apparel, sport shoes, climbing, rainwear, and outerwear garments, baby diapers, napkins, non-woven fabrics; in filtration systems for HVAC (heating, ventilating, and air conditioning) filters, HEPA (high-efficiency particulate air) filter, ULPA (ultra-low particulate air) filters, air, oil, fuel filters for automotive, filters for beverage, pharmacy, medical applications, filter media for new air and liquid filtration applications, such as vacuum cleaners; and in energy generation and storage for Li-ion batteries, photovoltaic cells, membrane fuel cells, and dye-sensitized solar cells, micropower to operate personal electronic devices via piezoelectric nanofibers woven into clothing, carrier materials for various catalysts, and photocatalytic air/water purification.

In spite of the growing demands, the industrialization and commercialization of micro- and nanofibers is hindered by the lack of efficient manufacturing technique. Currently the production of micro- and nanofibers is mainly achieved by nozzle-based methods, including electrospinning, wet spinning, and thermal extrusion In a platform of electrospinning, a fiber precursor is drawn into submicron-sized filaments by a high-voltage electric field. In general, a fiber material is pre-dissolved in a highly volatile solvent and forms a viscous solution. The solution is ejected through a nozzle (ex: a needle head), and an electric field (in kilovolts) is applied between the nozzle and an electrode plate. The electric field accumulates charges and produces an electrostatic force between the nozzle and electrode plate, and the electric force draws the fiber materials toward the electrode plate, forming a stream of thin filament. The stream of filament dries quickly upon reaching the electrode plate, and forms a sheet of fibers. The solution of fiber materials may be replaced with a melted polymer, which are heated above melting temperature upon ejection and solidified on the electrode plate at a lower temperature. The diameter of the as-formed fibers is determined by many factors, including nozzle size, feeding rate, material viscosity, material conductivity, surface tension, electrodes voltage, charge density, melting point, and the hydraulic pressure for driving materials through the nozzle. Electrospinning is most suitable for making submicronsized fibers, which have diameter ranged from one micron down to somewhere below 100 nm.

In wet spinning, fiber materials dissolved in a solvent is injected into an anti-solvent reservoir through a nozzle. The anti-solvent precipitates the materials, and turns the injected solution into a filament. A flow field is often created in the anti-solvent to help control the filament diameter, in which the force from flow may reduce the diameter of the injected stream. The filament diameter from wet spinning is determined by the nozzle size, feeding rate, material viscosity, surface tension, and the intensity of flow in anti-solvent. The anti-solvent can be replaced by a chemical that fixes or crosslinks the injected solution. In making calcium alginate fibers, for example, a solution of sodium alginate is ejected into a solution of calcium chloride, which turns alginate into hydrogel-based fibers. Wet spinning is suitable for making fibers that are thicker than 50 μm in diameter.

The mechanism of thermal extrusion is similar to wet spinning. In thermal extrusion, a precursor is heated above the melting temperature and ejected into cool air or a cooling liquid, which solidifies the melted materials. The fiber diameter from thermal extrusion is determined by nozzle size, feeding rate, material viscosity, and surface tension.

For all the above nozzle-based methods, a rotating reel is sometimes installed to further reduce the diameter of micro/nanofibers. The reel helps draw and thin the as-formed micro/nanofibers, while organizing the fibers into spools of bundles.

In spite of the efforts spent on developing micro/nanofibers manufacturing, nozzle-based methods have the following challenges: (1) limited production rate, (2) difficulty in controlling fiber diameter, (3) challenges in producing aqueous-based fibers, (4) challenges to achieve fiber alignment and separation. Some reasons for these limitations are follows.

A common limitation to the nozzle-based methods is their low production rate on making ultra-thin fibers. Additionally, diameter control is essential to the performance of micro- and nanofibers. For example, in electronics and optics applications, diameter affects the electric conductivity, mechanical elasticity, and refractive index of fibers, which in turn determine the device's functions. Diameter also affects the biomedical applications of micro- and nanofibers, as fiber size determines the topographical signals, e.g. surface roughness, anisotropy, porosity and material diffusivity, that are presented to living organisms, which influences the desired cell bioactivities including cell migration, cell proliferation, scar reduction, wound healing and tissue regeneration.

Controlling the diameter of micro- and nanofibers is a formidable task to the current technology. As mentioned above, in nozzle-based methods fiber diameter is determined by the tight coordination among different factors including nozzle diameter, feeding rate, material viscosity, surface tension, voltage, charge density, melting point, and the hydraulic force that pumps the precursor through the nozzle. Identifying the optimal parameters to achieve a desired fiber-diameter is often time-consuming, and the optimum can be highly different between different materials.

Furthermore, most of the current manufacturing methods are suitable for fibers within a narrow size range. Electrospinning is suitable for producing sub-micron sized fibers (100 nm to 1 μm), wet spinning for 50 to 200 μm sized fibers, and thermal extrusion is more suitable for fibers thicker than 100 μm in diameter. Manufacturers therefore need different platforms to cover different diameter ranges. Costs would be spent on multiple equipment setups, idle time, and personal training. A universal platform that covers a wide range of fiber diameter by simplified procedures may dramatically save costs and accelerate micro/nanofibers production.

Additionally, the nozzle-based methods demand tight coordination among manufacturing factors, and tolerate small variation in material properties, such as conductivity, viscosity and surface tension. It is particularly difficult for the nozzle-based methods to turn aqueous-based materials into micro- and nanofibers, due to the fact that aqueous-based materials have much lower viscosity (<10 k-cps) and higher surface tension (>50 mN/m) in comparison with water-free material and are much more difficult to coordinate with other manufacturing factors. This issue has hindered the application of micro/nanofibers to the pharmaceutical industry, as aqueous-based materials, such as hydrogels made of a large variety of natural and synthetic polymers, are increasingly used for biomedical products including wound dressing patches, drug delivery vehicles, and the tissue fillers for reconstructive surgery.

Alignment of micro- and nanofibers is essential to certain device functions. For electronics applications, the alignment of a bundle of micro/nanofibers determines anisotropy of conductivity, capacitance and inductance of the fibers component. For fuel cells and photovoltaic devices that use fibers electrodes, fiber alignment may facilitate charge separation and enhance the efficiency of the devices. For biomedical applications, aligned fibers provide topographic guidance to the activities of living cells and promote the regeneration of linear tissues including muscles, tendons and nerves.

Rotary reel is used for all nozzle-based systems to collect and simultaneously align fibers by constant rotation. In electrospinning, fiber alignment is often achieved by a duel electrode-plates system, in which two electrode plates collect the as-spun fibers in parallel while organizing them into a sheet of parallel filaments.

However, it remains highly challenging to align ultra-thin fibers (diameter <1 μm) using the traditional techniques. While electrospinning is suitable for making sub-micron fibers, electrospun fibers are prone to fusing together and forming a sheet, due the fiber annealing by solvent residue. This problem has limited the application of sub-micron fibers to the industry, as many devices require fibers separation. In battery devices, for example, fibers isolation is often demanded for effective charge separation. In tissue engineering products, fibers separation is required to facilitate matrix permeability, cell migration, nutrient transport and tissue ingrowth.

Alternative methods have been developed to circumvent the above limitations, but are still not satisfactory. Porogen leaching, anti-solvent precipitation, and supercritical-gas foaming were developed to mass-produce highly porous materials. Inside these porous materials, the porous microstructures resemble the topography of micro and nanofibers; however, these methods are incapable of diameter control, fiber alignment and fiber separation. Self-assembly of small molecule, e.g. amphiphilic peptides (short sequences of amino acids) has been created to produce submicron fibers with controlled diameter and chemical properties, but does not facilitate fiber alignment. Small molecule self-assembly of is also unsuitable for mass-production due to high costs for peptides synthesis.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method for producing microfibers comprising the steps of: (a) providing a base material; (b) forming the base material in a ring; (c) gripping opposing ends of the ring; (d) flipping one of the opposing ends relative to the other of the opposing ends, forming an upper portion and a lower portion; (e) folding the upper portion onto the lower portion; (f) stretching the folded upper and lower portions; and (g) repeating steps (d)-(f) as desired.

In an alternative embodiment, the present invention is a method for producing microfibers comprising the steps of: (a) providing a base material; (b) forming the base material in an elongate shape; (c) gripping opposing ends of the base material; (d) folding the base material (e) stretching the base material; (f) repeating steps (d)-(e) as desired.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 7A is a first schematic drawings showing a "Stretch-and-Fold" method of forming micro and nano fibers according to several exemplary embodiments of the present invention;

FIG. 7B is a plurality of exemplary fiber core shapes;

FIG. 7C is a plurality of exemplary core compartments;

FIG. 8A is a schematic drawing showing a first step in a method of forming micro and nano fibers according to another exemplary embodiment of the present invention;

FIG. 8C is a schematic drawing showing a third step in a method of forming micro and nano fibers according to another exemplary embodiment of the present invention;

FIG. 8D is a schematic drawing showing a fourth step in a method of forming micro and nano fibers according to another exemplary embodiment of the present invention;

FIG. 8E is a schematic drawing showing a fifth step in a method of forming micro and nano fibers according to another exemplary embodiment of the present invention;

FIG. 8F is a schematic drawing showing a sixth step in a method of forming micro and nano fibers according to another exemplary embodiment of the present invention;

FIG. 9B is a schematic drawing showing a second step in a method of forming micro and nano fibers according to another exemplary embodiment of the present invention;

FIG. 9C is a schematic drawing showing a third step in a method of forming micro and nano fibers according to another exemplary embodiment of the present invention;

FIG. 9D is a schematic drawing showing a fourth step in a method of forming micro and nano fibers according to another exemplary embodiment of the present invention;

FIG. 9E is a schematic drawing showing a fifth step in a method of forming micro and nano fibers according to another exemplary embodiment of the present invention;

FIG. 9F is a schematic drawing showing a sixth step in a method of forming micro and nano fibers according to another exemplary embodiment of the present invention;

FIG. 9G is a schematic drawing showing a seventh step in a method of forming micro and nano fibers according to another exemplary embodiment of the present invention;

FIG. 10B is a photograph showing the grippers of the machine of FIG. 10A;

FIG. 11B is a schematic drawing showing a method of forming micro and nano fibers according to another exemplary embodiment of the present invention;

FIG. 14A is a first illustration showing an exemplary strategy of using the cell-sized microfibers to control the mechanosensing of cells;

FIG. 14B is a second illustration showing an exemplary strategy of using the cell-sized microfibers to control the mechanosensing of cells;

FIG. 14C is a third illustration showing an exemplary strategy of using the cell-sized microfibers to control the mechanosensing of cells;

FIG. 14D is a fourth illustration showing an exemplary strategy of using the cell-sized microfibers to control the mechanosensing of cells;

FIG. 15A is a photo showing cell morphology and the activation of YAP;

FIG. 15B is a photo showing cell morphology and the activation of YAP;

FIG. 15C is a photo showing cell morphology and the activation of YAP;

FIG. 15D is a photo showing cell morphology and the activation of YAP;

FIG. 15E is a photo showing cell morphology and the activation of YAP;

FIG. 15F is a photo showing cell morphology and the activation of YAP;

FIG. 15G is a photo showing cell morphology and the activation of YAP;

FIG. 15H is a photo showing cell morphology and the activation of YAP; and

FIG. 15I is a graph representing the levels of YAP activation in each group from FIGS. 15B, 15D, 15F, and 15H.

DETAILED DESCRIPTION OF THE INVENTION

Figure 1A:
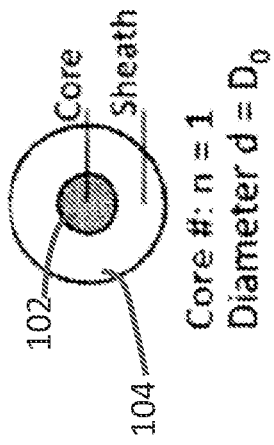
FIG. 1A is a first schematic drawing showing a "stretch and fold" method of forming micro and nano fibers according to an exemplary embodiment of the present invention.
Figure 1B:
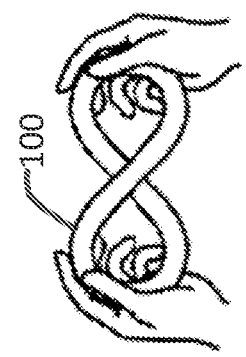
FIG. 1B is a second schematic drawing showing a "stretch and fold" method of forming micro and nano fibers according to an exemplary embodiment of the present invention.
Figure 1C:
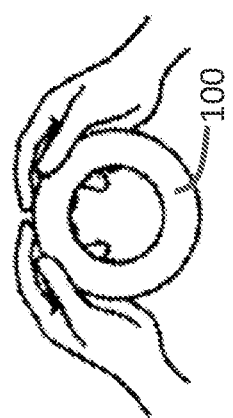
FIG. 1C is a third schematic drawing showing a "stretch and fold" method of forming micro and nano fibers according to an exemplary embodiment of the present invention.
Figure 1D:
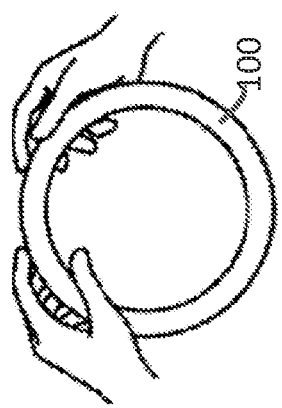
FIG. 1D is a fourth schematic drawing showing a "stretch and fold" method of forming micro and nano fibers according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention aims to provide a new fabrication platform to mass-produce ultra-thin filaments. These filaments have a tunable diameter that can be adjusted from hundreds of microns down to less than 100 nanometers. An automatic machine 100 is provided to implement this method and facilitate automatic manufacturing. As used herein, the filaments are referred as "microfibers" and "nanofibers", wherein microfibers are defined as the fibers thinner than 100 micrometer ($\mu m$), and nanofibers are fibers thinner than 100 nanometers (nm).

This present invention is directed to help micro/nanofibers manufacturers overcome the above limitations, and fabricate micro- and nanofibers with the following features: (1) high yield, (2) low cost, (3) widely tunable diameter (from hundreds of microns to below 100 nm), (4) broad material variety, and (5) easy alignment and separation.

Figure 1F:
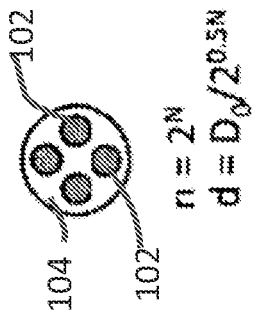
FIG. 1F is a sectional view of the micro and nano fibers formed according to a first exemplary embodiment.
Figure 1G:
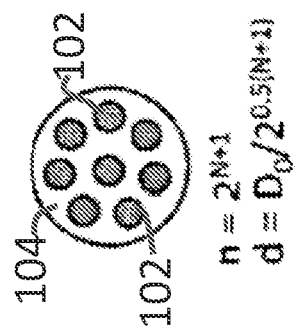
FIG. 1G is a sectional view of the micro and nano fibers formed according to a second exemplary embodiment.
Figure 1E:
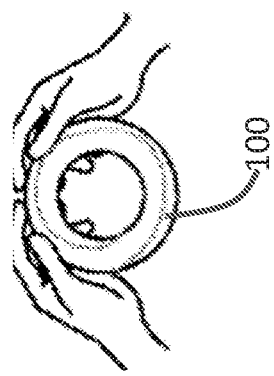
FIG. 1E is a fifth schematic drawing showing a "stretch and fold" method of forming micro and nano fibers according to an exemplary embodiment of the present invention.

The present invention provides ultra-fine fibers by repeatedly stretching and folding a precursor 100 in the shape of a ring (FIGS. 1A-1E). The ring is comprised of a core 102 and a sheath 104 compartments, shown in the sectional view of FIG. 1F. The core compartment 102 is the material for the micro/nanofibers, such as a polymer or a hydrogel, and the sheath compartment is made of a soluble, sacrificial material that keeps the core materials aligned and separated during fabrication. After stretching and folding the ring (precursor 100) for a certain number of times (n), the sheath compartment 104 is dissolved by a solvent, and fibers are retrieved from the core 102. Folding and stretching the precursor ring 100 by n times exponentially increases the number of the cores 102 ($N=2^n$), while exponentially decreasing the diameter of the cores 102 ($D=D_0/2^{0.5n}$). FIG. 1F shows a sectional view of ring 100 after one fold and FIG. 1G shows a sectional view of ring 100 after two folds. Accordingly, one can easily tune the diameter of micro-/nanofibers by adjusting the number of stretch-and-fold cycles, while producing the fibers at a high speed. Using the inventive method, it can take less than 5 minutes to decrease the core diameter from 5 mm to 200 nm, for which the number of folding is 24.

To help implement the inventive stretch- and fold method for the industry, a machine was developed to conduct the stretch- and fold procedures automatically. Designs and prototypes for this machine 200 will be described later herein.

In the first embodiment of the stretch-and-fold method, a ring-shaped precursor 100 made of porcine gelatin (for core 102) and polycaprolactone (PCL) (for sheath 104) was produced, and through the stretch-and-fold procedure the precursor 100 was converted into gelatin micro and nanofibers (FIG. 1). The diameter of core gelatin fibers was tuned from about 100 microns to below 100 nanometers by increasing the number of stretch-and-fold cycles from 10 to 28, and released the core fibers 102 by dissolving the PCL sheath 104. The stretch-and-fold procedure reduces the diameter of the core fibers exponentially; therefore the production rate of micro and nanofibers is extremely higher than any of the existing manufacturing methods. Such production rate is not determined the quantity of material; a larger yield can be achieved by starting the stretch-and-fold procedure with a larger precursor ring 100. Following are experimental details.

Prepare Gelatin Solution

To prepare the gelatin for microfiber fabrication, gelatin from porcine skin (Sigma-Aldrich, Cat #1890) was dissolved in pure water at 50 wt % and stirred at 100 rpm on a hot plate at 70° C. After the gelatin powder was fully dissolved, the gelatin solution was centrifuged at 50° C. for 10 minutes to remove air bubbles.

Encapsulating Gelatin PCL Ring and the Stretch-and-Fold Procedures

A ring-shaped precursor is prepared as follows. Polycaprolactone (PCL) pellets (50 g) were melted in a bath of olive oil at 75° C. After becoming transparent and plastic, the clump of PCL was removed from the oil bath and molded into a tube with 5 mm internal diameter (ID) and 20 mm external diameter (OD). The PCL tube became opaque and solidified after cooling by air at room temperature. The gelatin solution obtained in the previous step was injected into the PCL tube using a 25 mL syringe. The ends of the PCL tube were sealed by melted PCL to contain the gelatin solution.

To conduct stretch-and-fold procedures, the PCL tube, now with a core of gelatin, was heated in a 75° C. water bath with constant rolling. Upon exceeding the glass transition temperature of PCL (>60° C.), the PCL tube became plastic and accessible to stretching and folding. To form a PCL ring, the ends of the PCL tube were joined together as shown in FIG. 1A. Immediately after this step, the ring was repeatedly stretched and folded (FIGS. 1B, C and D), thinning the gelatin cores, until the desired core diameter is reached. The stretch-and-fold procedure was conducted swiftly in the ambient air before the PCL solidified. The folded PCL ring was immediately cooled and solidified at room temperature.

Retrieve Gelatin Micro/Nanofibers from PCL

Figure 2A:
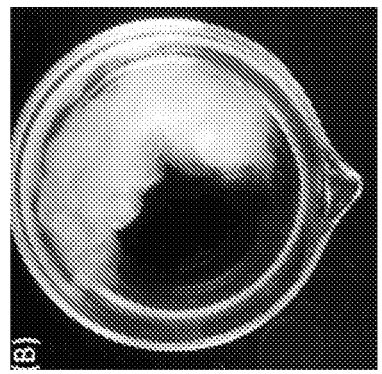
FIG. 2A is a first photograph showing fibers formed using the process shown in FIGS. 1A-1E.
Figure 2C:
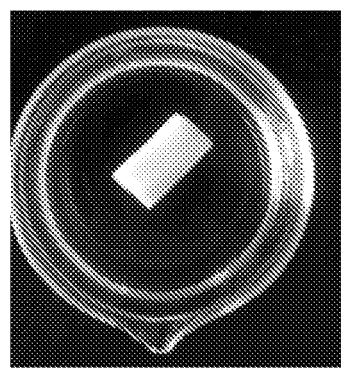
FIG. 2C is a third photograph showing fibers formed using the process shown in FIGS. 1A-1E.
Figure 2B:
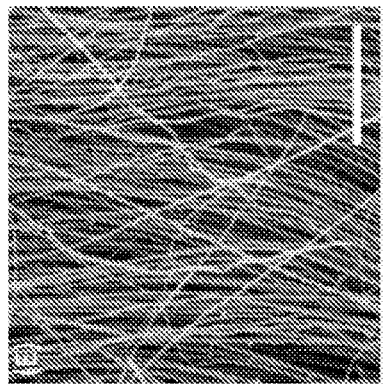
FIG. 2B is a second photograph showing fibers formed using the process shown in FIGS. 1A-1E.

To retrieve micro/nanofibers, the stretched-and-folded PCL ring was cut into 5 to 8 cm segments, and dissolved by acetone at 30° C. under mild agitation, which released the gelatin core fibers (FIG. 2A to 2B). As-retrieved fibers were rinsed by fresh acetone at 30° C. for five times to remove PCL residue (30 minutes each time). The resulting fibers was fixed in glutaraldehyde solution (0.1% in methanol) for three hours, neutralized in lysine solution (1% in methanol), dialyzed against distilled water for 3 days, and finally freeze-dried for storage. The diameter of core fibers was adjustable by the number of stretch-and-fold cycles (FIG. 2C), and can be tuned from hundreds of micron down to sub-micron, following a simple equation: $D_n = D_0 / 2^{0.5n}$ where n the number of stretch-and-fold cycles, $D_0$ is the original core diameter before folding, and $D_n$ is the core diameter after n stretch-and-fold cycles.

Obtain Aligned Micro/Nanofibers

Figure 2D:
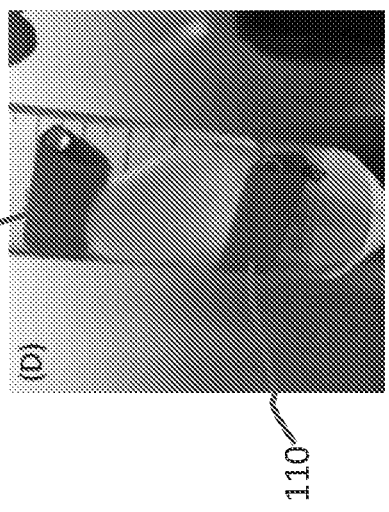
FIG. 2D is a fourth photograph showing fibers formed using the process shown in FIGS. 1A-1E.
Figure 2E:
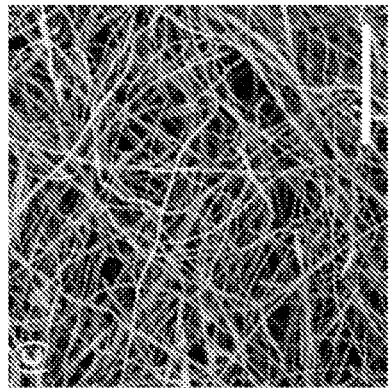
FIG. 2E is a fifth photograph showing fibers formed using the process shown in FIGS. 1A-1E.

One major advantage of the stretch-and-fold method is the ease to obtain aligned fibers, since the PCL sheath maintain the linear organization of core fibers throughout stretching and folding. To maintain the micro/nanofibers alignment, clips 110 were used to constrain the core fibers at the ends of the PCL segments (FIG. 2D), before following through the above protocols. This method produces a bundle of aligned micro/nanofibers (FIG. 2E).

Measure Fiber Diameter by Fluorescent and Scanning Electron Microscopy

Gelatin micro/nanofibers have wide biomedical application. The diameter of gelatin fibers influences the efficiency of biochemical reaction, nutrient and mass diffusion, and the cellular responses to the microenvironment following mechanosensing. This mechanism has been shown to dictate the outcome of bone healing by adipose derived stem cells.

Figure 3A:
FIG. 3A is a first photograph showing fibers formed using the process shown in FIGS. 1A-1E.
Figure 3B:
FIG. 3B is a second photograph showing fibers formed using the process shown in FIGS. 1A-1E.
Figure 3C:
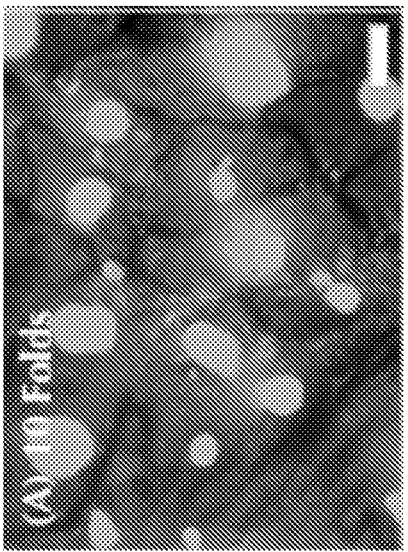
FIG. 3C is a third photograph showing fibers formed using the process shown in FIGS. 1A-1E.
Figure 3D:
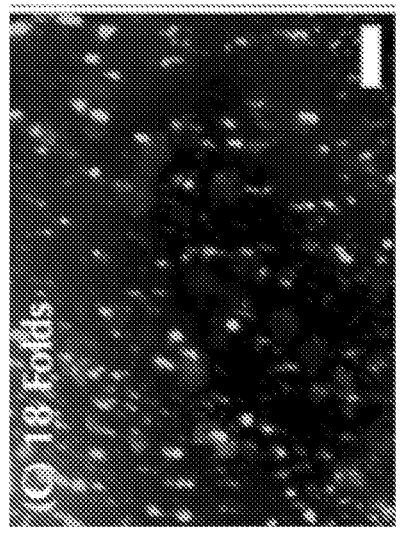
FIG. 3D is a fourth photograph showing fibers formed using the process shown in FIGS. 1A-1E.
Figure 3E:
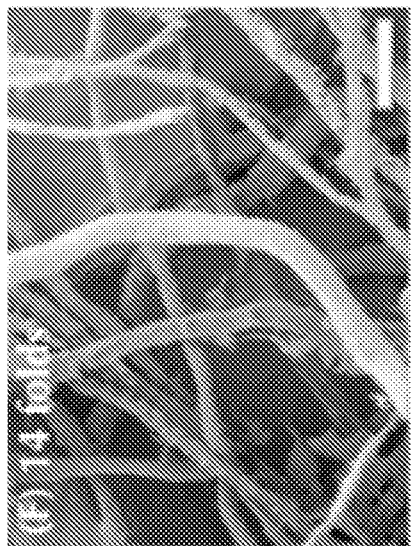
FIG. 3E is a fifth photograph showing fibers formed using the process shown in FIGS. 1A-1E.
Figure 3F:
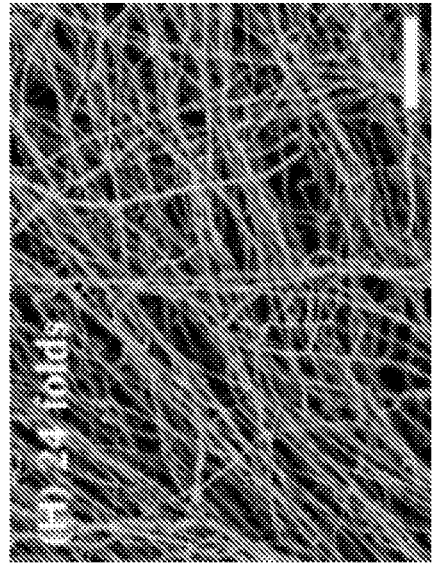
FIG. 3F is a sixth photograph showing fibers formed using the process shown in FIGS. 1A-1E.
Figure 3G:
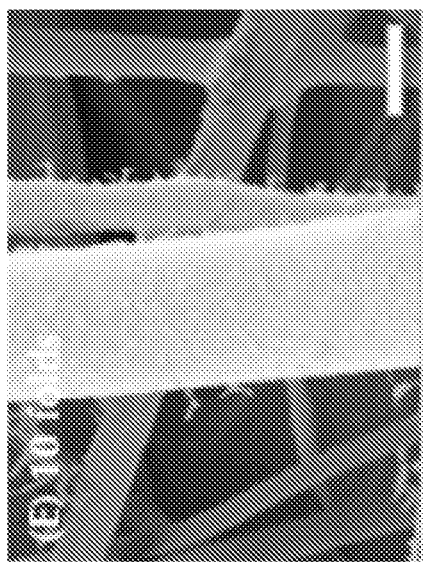
FIG. 3G is a seventh photograph showing fibers formed using the process shown in FIGS. 1A-1E.
Figure 3H:
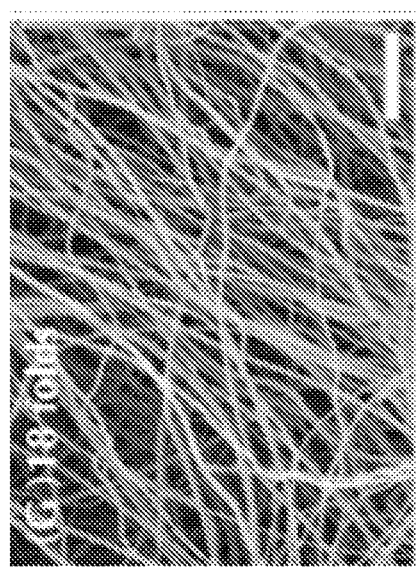
FIG. 3H is an eighth photograph showing fibers formed using the process shown in FIGS. 1A-1E.
Figure 3I:
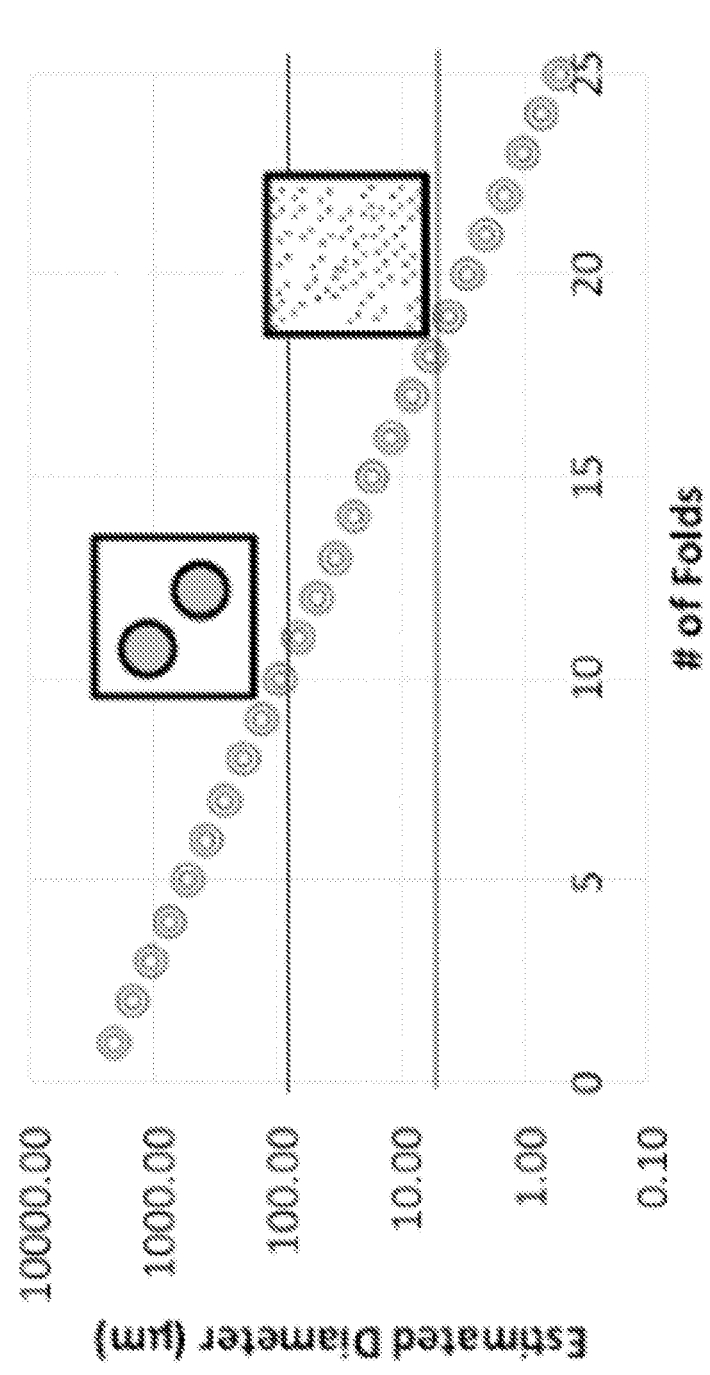
FIG. 3I is a graph showing the diameter of the fibers formed throughout the process.
Figure 4A:
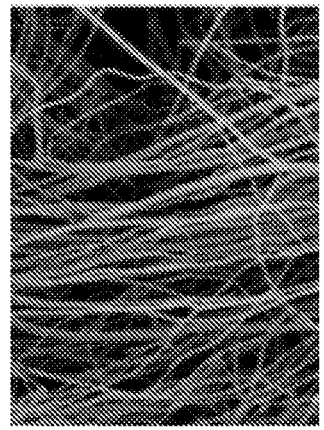
FIG. 4A is a first photograph showing fibers formed using the process shown in FIGS. 1A-1E.
Figure 4B:
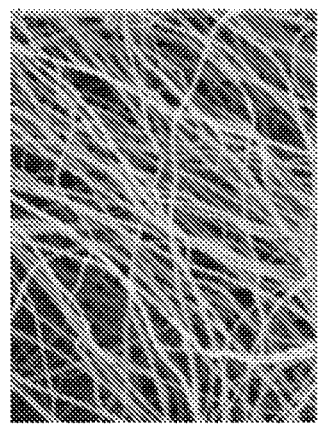
FIG. 4B is a second photograph showing fibers formed using the process shown in FIGS. 1A-1E.
Figure 4C:
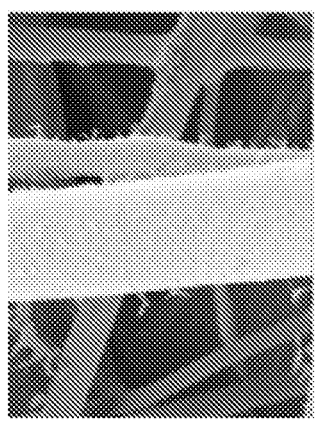
FIG. 4C is a third photograph showing fibers formed using the process shown in FIGS. 1A-1E.
Figure 4D:
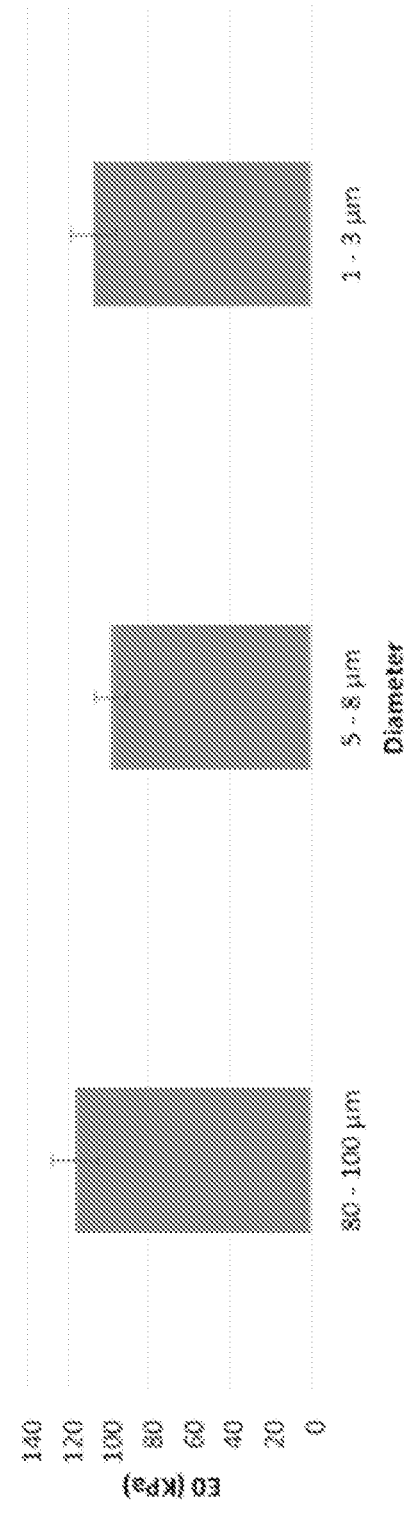
FIG. 4D is a graph of the respective Young's Modulus of the fibers of FIGS. 4A-4C that were formed.

To verify the effect of stretch-and-fold cycles on fiber diameter, the PCL ring with different cycles were cut into slices, fluorescently stained for gelatin at the cross-section, and imaged to measure the cores diameter (FIG. 3A to 3D). The cores diameter was also measured on the as-formed fibers using scanning electron microscope (SEM) (FIG. 3E to 3H). The fiber diameter at the 10th stretch-and-fold cycle was about 50 microns. Upon the 24th cycle, the average fiber diameter became 400 to 500 nanometer. At the $28^{th}$ cycle, the average fiber diameter fell between 100 and 200 nanometer. Results from the measurements demonstrated that the fiber diameter underwent an exponential decrease as the number of stretch-and-fold cycles linearly increased (FIG. 3I).

Smallest Available Diameter Depends on the Speed of Stretch-and-Fold

The smallest fiber diameter achievable by the stretch-and-fold method is determined by the following factors: (1) viscosity of the core material, (2) viscosity of the sheath material when heated above the glass transition temperature; (3) surface tension at the interface between the core material and the sheath material above glass transition temperature; and (4) the speed of stretch-and-fold procedure.

The Theory of Rayleigh-Plateau Instability predicts that, as the core diameter gradually decreases following stretching and folding, the surface tension at the sheath-core interface will eventually overcome the viscosity of sheath/core materials, and break the core fibers into bead-like segments. This phenomenon resembles the breakup of a stream of tap water, in which the core resembles water and the sheath material resembles air.

The inventors discovered that that the effect of Rayleigh-Plateau Instability on the core compartment can be arrested by using sheath/core materials of higher viscosity, or by accelerating the stretching and folding cycles. Higher viscosity for sheath/core material can be obtained by using gelatin and PCL of higher molecular weight.

On the other hand, a faster stretch-and-fold procedure guarantees that the process of core thinning can be finished before the core start to breakup via Rayleigh-Plateau Instability. In one embodiment, the inventors found that continual, 100-200 nm nanofibers made of gelatin can be produced via 28 stretch-and-fold cycles when the following conditions were met:

(1) Use medium-molecular-weight (~50,000 Da) PCL for the sheath.

(2) Use 50% w-w, 300 boom porcine gelatin for the core, and (3) Complete the stretch-and-fold cycles in less than 10 minutes, then immediately cool the precursor to room temperature.

In contrast, when the above conditions (1) and (2) were met, but the time for stretching-and-folding procedure increased to more than 20 minutes, the maximum achievable number of stretch-and-fold cycles was 14 (forming 15-20 micron fibers); beyond the 14th cycle the core started to break into microparticles instead of maintaining the filament shape:

(1) Medium-molecular-weight PCL for the sheath.

(2) 50% w-w, 300 boom porcine gelatin for the core.

(3) Complete the stretch-and-fold cycles in more than 20 minutes, then immediately cool the precursor to room temperature.

Since the speed of stretch-and-fold is essential to the continuity of micro/nanofibers, an automatic stretch-and-fold machine would be most desirable to manufacturers. This machine may accelerate the stretch-and-fold cycles, provide more repeatable results, and help eliminate the effects of Rayleigh-Plateau instability.

Tuning Fiber Elasticity

Elasticity is another important factor for the function of micro/nanofibers, and is especially crucial to biomedical applications. For tissue fillers and wound dressers, the elasticity of micro/nanofibers determines the biophysical signals that cells sense from the product, which in turn affects the pace of wound healing and the formation of different tissue types through cell-mechanosensing. Matrices softer than 1 kPa in Young's modulus were shown to promote fat tissue formation, as matrices harder than 50 kPa shown to promote bone formation.

Elasticity of fibers produced by stretching-and-folding is determined by the crosslinking of core compartment. In our first embodiment, fiber crosslinking was achieved by using glutaraldehyde (0.1% in methanol, 3 hours), which crosslinks porcine gelatin rapidly by binding lysine croups. The elasticity given by glutaraldehyde treatment can be tuned from 0.1 kPa to 20 kPa, as higher glutaraldehyde concentration and longer treatment produce higher elasticity. To enhance the mechanical property of fibers, glutaraldehyde can be replaced or added with other crosslinking chemical, such as 1,4-butanediol diglycidyl ether and methacrylate.

In comparison with glutaraldehyde, 1,4-butanediol diglycidyl ether (BDDE) is a slower crosslinker, but the slower reaction enables more uniform BDDE diffusion and enhances the mechanical homogeneity of fibers. The following steps are added to the protocol described above if BDDE is used instead of glutaraldehyde:

(1) Add 0.01% to 1% BDDE to the gelatin solution, which crosslinks gelatin via lysine function groups. Glycidol at higher concentration leads to higher Young's Modulus.

(2) Omit the use of glutaraldehyde.

(3) Before retrieving the core fibers from PCL, treat the as-folded PCL ring in 50% oil bath for 24 hours. The heating accelerates glycidol-crosslinking.

Methacrylate groups form the stiffest matrix in comparison with glutaraldehyde and BDDE, and can significantly increase the range of Young's Modulus. The following steps are added for methacrylatebased crosslinking:

(1) After retrieving the core fibers from PCL, rinse the fibers in methanol with 1% to 20% methacrylate anhydride for 30 minutes at room temperature. This introduces methacrylate groups to gelatin via lysine groups.

(2) Use glutaraldehyde as described above.

(3) Crosslink methacrylate groups before freeze-drying: rinse the fibers in water containing 0.05% phenyl-2,4,6-trimethylbenzoyl-phosphinate (LAP), expose the fibers to ultraviolet light (4 mW/cm$^2$) for 10 minutes, then wash the fibers twice by distilled water. Methacrylate crosslinking leads to a final Young's Modulus of 10 to 100 kPa, which is tunable by changing the concentration of methacrylate anhydride in step (1) immediately above.

Independent Control of Fiber Elasticity and Diameter

Since elasticity and diameter are both important to the performance of micro/nanofibers, decoupled and independent control of these parameters would be highly desirable to the manufacturers. To verify whether fiber diameter and elasticity can be independently tuned, microfibers produced with different diameters (via different stretch-and-fold cycles) but the constant crosslinking density (BDDE) were prepared following the above protocol. The fiber diameter was measured by using SEM, and the fiber elasticity was measured by nano-indentation based on atomic force microscope (AFM).

Nanoindentation was carried out via a Dimension Icon AFM (BrukerNano, Santa Barbra, Calif.) under physiological-like conditions (PBS, ionic strength≈0.15 M, pH 7.4, indentation rate≈10 µm/s). Custom-made borosilicate microspherical tips with radii comparable to the size of as-manufactured fibers (nominal spring constant k≈0.2 N/m) were used to simulate the micromechanical force that living cells sense. At each indentation location, the force versus depth (F-D) curves were quantified through an established calibration procedures. In the meantime, contact mode imaging was performed with the same tip under minimized compressive force (~1 nN) to quantify the fibers 3D topography, i.e. thickness t, following an existing protocol. Effective indentation modulus, $E_{ind}$, was calculated by applying linear elastic Hertz model to the loading portion of each F-D curve. Substrate constraint effects due to finite thickness t was corrected by $F=4E_{ind}R^{1/2}D^{3/2}\chi/[3(1-v_P^2)]$ where $v_P$ is the Poisson's ratio (≈0.49 for highly swollen hydrogels), and $\chi$ the substrate constraint correction factor (negligible when thickness >10×maximum of D). In all measurement, the maximum indentation depth, $D_{max}$, was made <500 nm (<20% local strain) to minimize material mechanical non-linearity. At Dmax, the maximum tip-sample contact radius is ≈2 µm, and thus, spatial maps of Eind was obtained at this resolution of ≈2 µm through controlling the close-looped X-Y piezo-stage of the AFM.

The results from nanoindentation showed that the fiber elasticity was consistently 110±10 kPa regardless of varying fiber diameter (FIG. 4). This result verifies that the stiffness and diameter of stretched-and-folded fibers can be independently controlled by the crosslinking density of the core compartment and the number of stretch-and-fold, respectively.

Advantages of Stretch-and-Fold Method in Comparison with Existing Techniques

Micro- and nanofibers are traditionally fabricated by nozzle-based methods, such as electrospinning, wetspinning and thermal extrusion. These methods have the production rates that decrease exponentially as the fibers become thinner, are difficult to use for controlling fiber diameter, and tolerate small variations in material properties, such as melting point, material conductivity, electric permeability and viscosity.

These methods are prone to low yield, high cost, and limited material options in making micro- and nanofibers. In contrast to the existing techniques, the inventive stretch-and-fold platform provides unique advantages as follows:

(1) Ease for Mass Production: In contrast to the nozzle-based methods, the stretch-and-fold method is based on cycles of stretching and folding and suitable for mass-production. The production rate of the stretch- and fold method is insensitive to the diameter of micro/nanofibers, since the fiber diameter can be rapidly reduced, in several minutes, from hundreds of micron to below 100 nm. A larger production rate can be achieved by starting the stretch-and-fold protocol with a larger precursor.

(2) Easily Customizable Fiber Diameter: In this invention the fiber diameter is controlled by the number of stretch-and-fold cycles, and can be easily customized to meet consumers' requirements. By simply increasing the number of stretch-and-fold cycles, the fiber diameter can be tuned from hundreds of micron down to below 100 nm. In contrast, changing fiber diameter in the traditional methods often demand a complex re-coordination among multiple factors, such as voltage, temperature, nozzle size, polymer density, extrusion speed, and the type of solvent(s) being used. Such optimization demands extra labors, materials and cost, and has to be redone for every new material.

(3) Versatile Materials and Broad Applications: The principle of stretch and fold procedure is based on the pseudo-plasticity of sheath materials, and is not based on the property of the core materials that form fibers. Choices for fiber material are therefore highly versatile and can incorporate different polymers, metals and metallic oxides of various physical and chemical properties. The stretch-and-fold fibers are useful for many applications. Micro/nanofibers of highly resilient polymers may be used for body armor. Fibers made of photovoltaic polymer or metallic-oxides may be used for solar plates. For biomedical applications, the stretch-and-fold method can be used to produce hydrogel-based fiber for wound dressing, or engineering a broad variety of tissue types such as of muscles, cartilage, bones and blood vessels. The inventive stretch-and-fold method has been used to produce micro and nanofibers from different hydrogels including gelatin, chondroitin sulfate and hyaluronic acid.

(4) Ease for Fiber Alignment: Alignment of micro- and nanofibers determines the fibers' anisotropy of conductivity, capacitance and inductance, and is crucial to the charge-separation for fuel cells and photovoltaic devices. Aligned fibers also provide topographic guidance to biological cells and promote the healing and regeneration of linear tissues, including muscles, tendons and nerves. However, alignment of ultra-thin fibers remains highly challenging due to the effect of fiber annealing associated with the existing techniques. In this invention, micro and nanofibers are automatically aligned by the stretch-and-fold procedure, while being isolated by the sheath compartment. Bundles of separated, aligned micro/nanofibers are produced upon the removal of sheath compartment.

Application Examples

The following examples demonstrate the potential applications of stretch-and-fold fibers.

Application I: Tissue-Engineering Scaffolds for Cartilage Repair

The stretch-and-fold method has been applied to the regeneration of cartilage tissue. The experiment was conducted using gelatin microfibers by the stretch-and-fold method, along with human mesenchymal stem cells that are capable of producing cartilage-like tissues.

Micro/nanofibers has gained great popularity as a biomaterial for tissue engineering. For healing muscles, nerves and tendon tissue, for example, aligned micro- and nanofibers may provide the biophysical cues for guiding cell alignment and tissue growth. On the other hand, non-aligned fibers can provide a highly porous space for cell spreading, migration and proliferation in 3D, which promotes the regeneration of bones, cartilage and fat tissues. However, prior approaches to fabricate micro- and nanofibers, such as electrospinning, thermal spinning and wet spinning, are often limited due to the difficulty in controlling fiber diameter, small variety of suitable materials, long fabrication time, and low production rate.

Furthermore, it is difficult to create micro- and nanofibers using hydrogels, which are major biomaterials for regenerative medicine. To overcome those limitations, the inventors have developed the present method to mass-produce micro- and nanofibers using stretching and folding. This technique is designed for creating micro- and nanofibers by a clinical-relevant quantity, and is especially suitable for making hydrogel-based fibers. To verify the potential for tissue engineering, human mesenchymal stem cells (hMSCs) were encapsulated in hand-spun microfibers (2 microns in diameter) for chondrogenesis study. Preliminary results showed uniform cell distribution, cartilage-like extracellular matrix (ECM) formation, and significantly increased mechanical property in the microfiber-based scaffolds.

Scaffolds preparation. Gelatin fibers were produced through repeatedly stretching and folding a polymer ring that encapsulates gelatin (FIGS. 1-1%1). The ring had a core-sheath structure, the sheath was made by polycaprolactone (PCL) and the core was 50% porcine type-A gelatin in water. After stretching and folding for desired number of cycles, fibers were retrieved by dissolving the PCL sheath in acetone.

As-collected fibers were methacrylated, aldehyde fixed, and freeze-dried for storage (following the protocol for methacrylate-crosslinking as described above). For scaffold formation, the fibers were rehydrated, mixed with cells and finally crosslinked by UV exposure.

hMSCs were encapsulated in scaffolds at a density of either 5 or 10 million cells per $cm^3$, and cultured in chondrogenic media containing TGF-ß3 for 28 days. Mechanical testing, histology and immunofluorescence were conducted from day 0 to day 28 for each group.

Figure 5A:
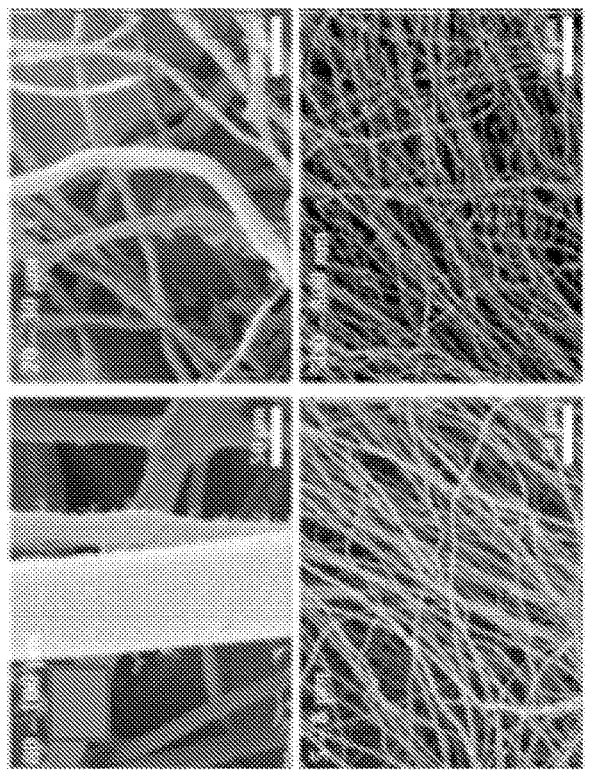
FIG. 5A is a first set of photographs showing fibers formed using the process shown in FIGS. 1A-1E.
Figure 5B:
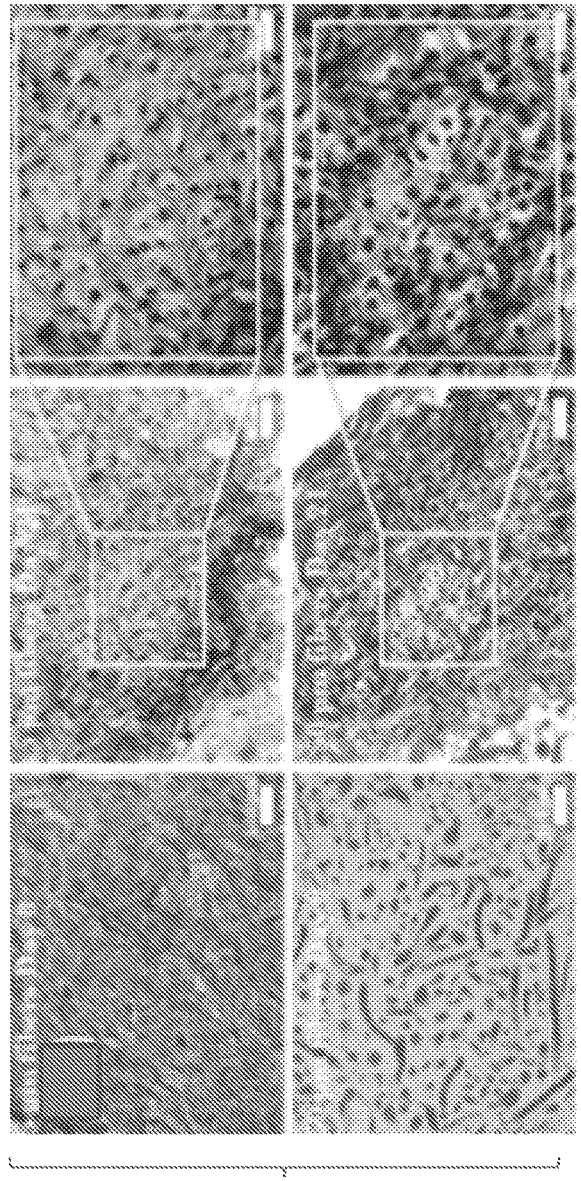
FIG. 5B is a second set of photographs showing fibers formed using the process shown in FIGS. 1A-1E.
Figure 5C:
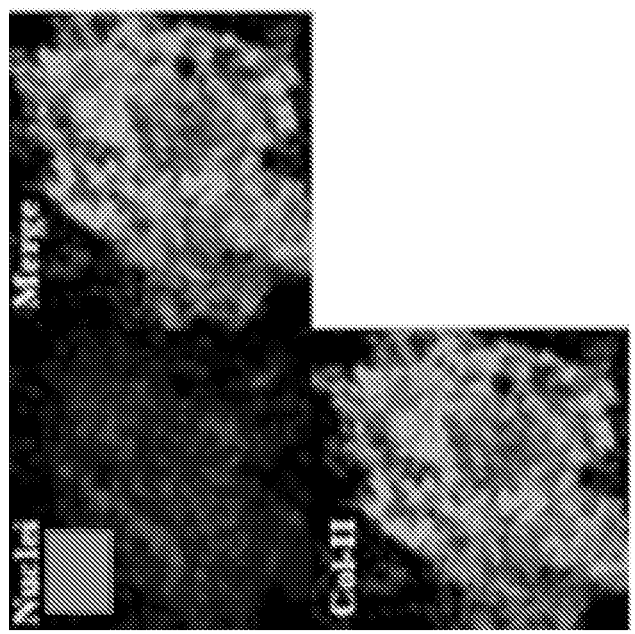
FIG. 5C is a third set of photographs showing fibers formed using the process shown in FIGS. 1A-1E.
Figure 5D:
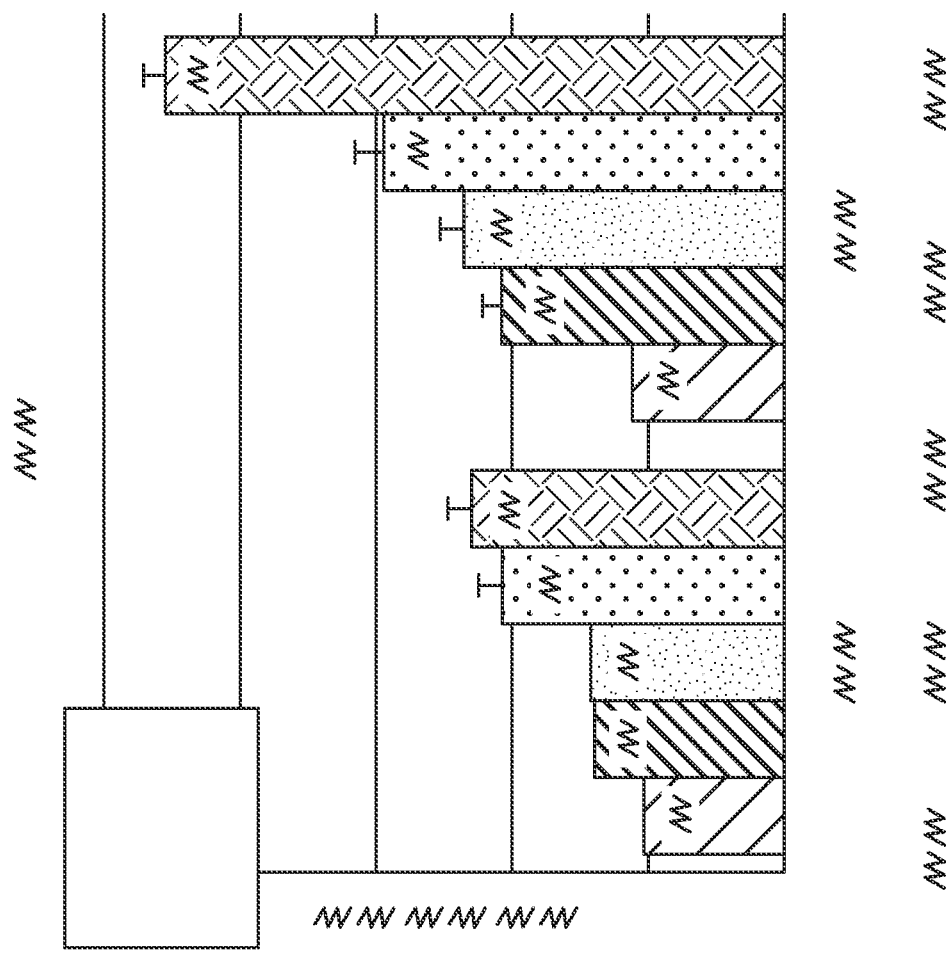
FIG. 5D is a graph showing a change of scaffold stiffness from day 0 to day 28.

The diameter of stretched-and-folded fibers is determined by the number of stretch-and-fold cycles. 20 cycles of stretch-and-fold led to cell-sized fibers (~5 μm-thick), as 14-cycles led to fibers much larger than cells (50 μm-thick fibers). Increasing the cycles number to 26 led to nanofibers that are about 500 nm in diameter (FIG. 5A). The total time for stretch-and-fold procedure took less than 20 minutes, regardless of the quantity and diameter of micro- or nanofibers. For chondrogenesis study, the macroporosity of scaffolds was determined by fiber diameter: 5 μm fibers produced 10 to 20 μm macroporosity, as 50 μm fibers produced macropores up to 200 microns. Cartilage-based ECM content, including type-II collagen, increased significantly within 28 days and signified the progress of cartilage-like tissue formation (FIG. 5B and FIG. 5C). The scaffold macroporosity supported the diffusion of cell-produced ECM and dramatically increased the mechanical property of scaffolds. The stiffness of scaffolds increased from 50 up to 220 KPa, approaching 25% of native cartilage within four weeks. (FIG. 5ED)

The inventive to produce micro/nanofibers was verified the potential of the microfibers for tissue engineering using a chondrogenesis study. Results showed that the microfibers support cell engraftment, chondrogenesis, ECM penetration and cartilage-like tissue formation.

Application II: Aligned Microfibers for Linear Tissue Engineering

To promote desired cell fates and tissue-formation, efforts have been made to create tissue-engineering scaffolds with customized microstructures that mimic the extracellular matrix (ECM) in the human body. Aligned microfibers are promising for linear tissue formation, such as muscle, nerve, and layers of skin. Diameter of fiber determines the spatial guidance for cell spreading, cytoskeleton organization, and cell mechanosensing that triggers proliferation and cell differentiation.

Prior methods to fabricate aligned microfibers include electrospinning, wet spinning, and macromolecular self-assembly. However, these methods often have difficulty in controlling fiber diameter, due to the limited tunability in fabrication conditions. Prior methods are also challenged by the needs for high production rate, and tend to become extremely slow when producing sub-micron scale fibers. Furthermore, aligned fibers produced by existing methods are often difficult to cellularize in 3D, due to the fact that the fibers can easily adhere with each other upon production, leaving insufficient space for cell diffusion.

The inventive "stretch-and-fold" method mass-produces microfibers with linear alignment and easily customizable diameter. The method enables a widely tunable fiber diameter and extremely high fiber production rate. By stretching and folding a ring of porcine gelatin, aligned gelatin fibers with desired diameter can be easily produced. This method provides microfibers with aligned fibrous microstructures, which facilitates uniform cell distribution and cell spreading in 3D.

Figure 6A:
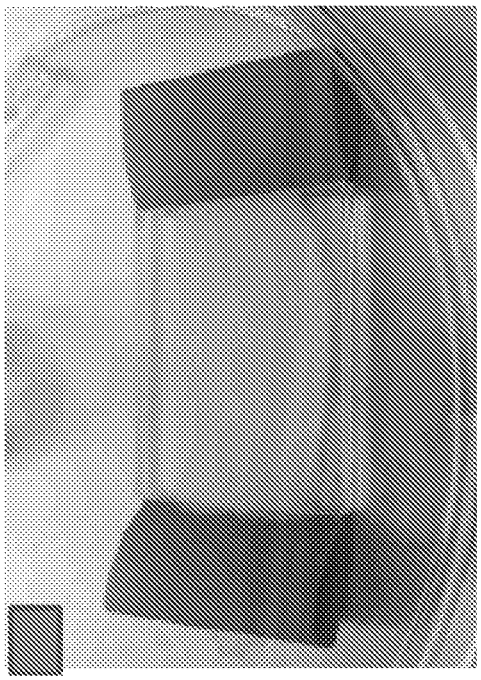
FIG. 6A is a first photograph of the fibers formed using the process.
Figure 6B:
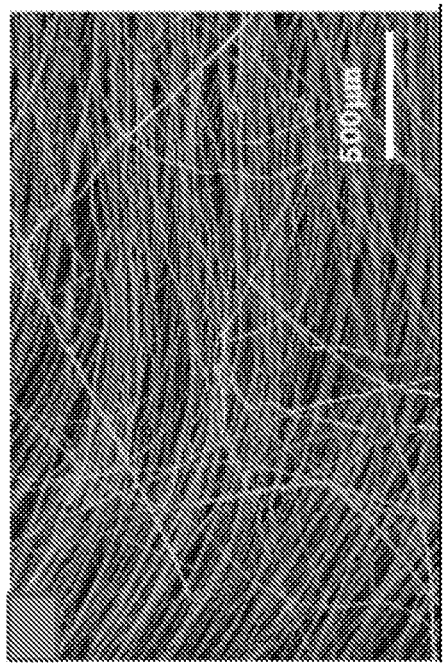
FIG. 6B is a second photograph of the fibers formed using the process.
Figure 6C:
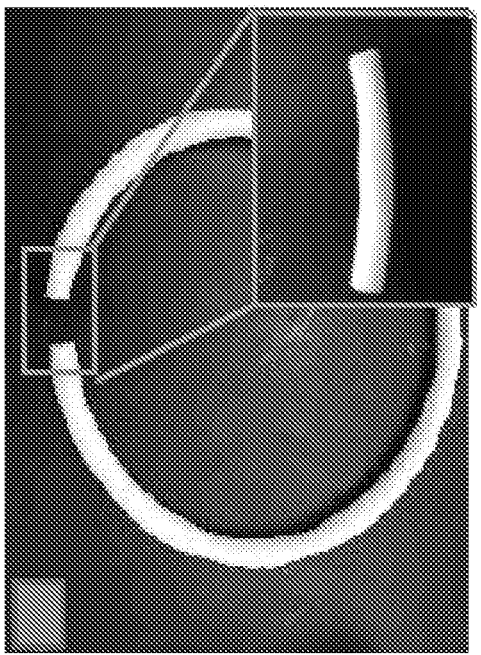
FIG. 6C is a third photograph of the fibers formed using the process.

Aligned microfibers were obtained by repeatedly stretching and folding a ring of porcine gelatin (50% in water). (FIG. 6A). Within N cycles, the length of the fiber rapidly increased by 2N folds of the original gelatin ring length, the diameter of the fiber decreases by 2N/2 folds, while a bundle of microfibers being formed. PCL was coated on the gelatin ring to keep the microfibers separated from each other during stretching and folding. Microfibers were retrieved by dissolving the PCL with acetone, while the alignment of the fibers was maintained by clipping the ends of fibers (FIGS. 6a-6B). As-produced fibers were methacrylated, glutaraldehyde-fixed, washed and finally freeze-dried for storage. To verify biocompatibility and the efficacy of 3D cell-culture, hMSCs were mixed among the microfibers (which were dissociated from each other and allowed uniform cell distribution), and the microfibers were crosslinked by light (365 nm, 4 mW/cm$^2$, 5 min) to become a 3D scaffold. (FIG. 6C) Cell attachment and spreading was monitored using fluorescent microscope.

Figure 6D:
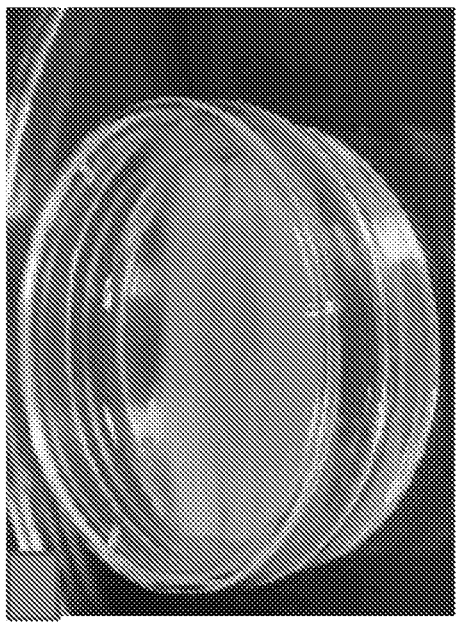
FIG. 6D is a fourth photograph of the fibers formed using the process.
Figure 6E:
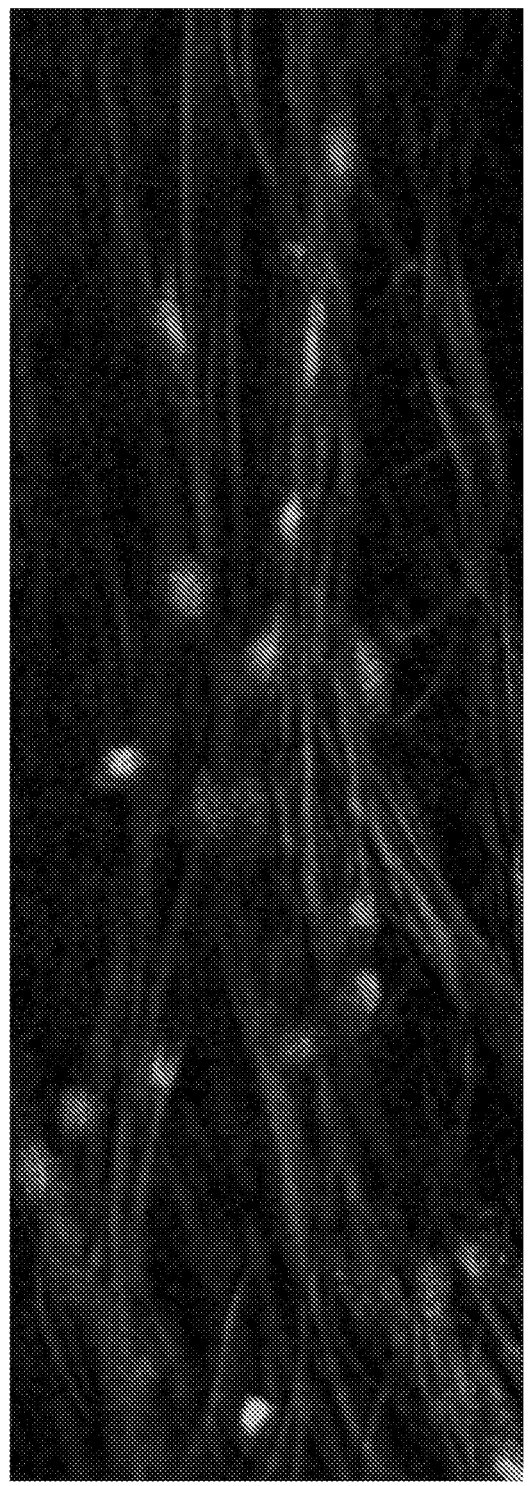
FIG. 6E is a fifth photograph of the fibers formed using the process.

This method is able to produce nanofibers less than 200 nm in diameter, if the 28 stretch-and-fold cycles are conducted. Resulted fibers possess high diameter uniformity and maintained alignment (FIG. 6D). The stiffness of the microfiber can be adjusted from 10 kPa to 200 kPa, as quantified by AFM, by tuning the dose of glutaraldehyde and methacrylate anhydride. From cell study, fluorescent imaging demonstrated the spreading of hMSCs along the stretched-and-folded microfibers (~10 um diameter, 18 stretch-and-fold cycles), and the uniform cell distribution within the 3D microfiber-based scaffold. See FIG. 6F. The above results demonstrate the potential of our stretched-and-folded micro/nanofibers for regenerative medicine.

The inventive method mass-produces pre-aligned microfibers as tissue engineering scaffold. The hand-spinning protocol facilitates mass-production and the easy control of fiber diameter. The fiber diameter can be tuned, by the number of stretch-and-folding cycles, from hundreds of microns down to less than 100 nm. Well-separated microfibers enable uniform cell distribution and encapsulation. These microfibers can be widely useful for engineering linear tissues, such as muscles, tendons and nerves.

The above embodiments verify the efficacy of the stretch-and-fold method on micro/nanofiber production and biomedical applications. However, the nature of stretch-and-fold method is not limited by these embodiments.

Materials for the core 102 and the sheath 104 of precursor 100 are not limited to porcine gelatin and PCL. Any deformable materials (liquid, plastic or pseudoplastic) can be used as the core material, and any thermoplastic, plastic or pseudoplastic materials can be used as the sheath material. Besides polymers, the core and sheath materials can also be an inorganic material, such as metals or metallic oxides.

Alternative materials for the core of precursor are list below:

| Core Material Category | Material | Conditions for Stretch and Fold Procedure |
| --- | --- | --- |
| Natural Polymer | Gelatin | 20~50% in distilled water. Crosslinkable by glutaraldehyde, BDDE, or methacrylate. |
| | Collagen | 1~10% in water at pH <3. Crosslinkable by glutaraldehyde, BDDE, or methacrylate. |
| | Elastin | 1~10% in water at pH <3. Crosslinkable by glutaraldehyde, BDDE, or methacrylate. |
| | Hyaluronic Acid | 10~50% in distilled water. Crosslinkable by BDDE. |
| | Chondroitin sulfate | 20~50% in distilled water. Crosslinkable by BDDE. |
| | Dextran | 20~50% in distilled water. Crosslinkable by BDDE |
| | Chitosan | 10~20% in water at pH >8. Crosslinkable by glutaraldehyde. |
| | Alginate | 5~10% in water. Crosslinkable by calcium diffusion. |
| | Heparin/Heparin Sulfate | 10~20% in water. Crosslinkable by BDDE. |

-continued

| Core Material Category | Material | Conditions for Stretch and Fold Procedure |
|---|---|---|
| Synthetic Polymer | Polyethylene glycol, amine functionalized | 10~95% in distill water. Crosslinkable by glutaraldehyde, BDDE, or methacrylate. |
| | Polyethylene glycol, hydroxyl functionalized | 10~90% in distill water. Crosslinkable by BDDE. |
| | Polycaprolactone | 65° C., cooled to room temperature (RT) when done. |
| | Polylactic Acid | ~150° C., cooled to RT when done. |
| | Polyglycolic acid | ~230° C., cooled to RT when done. |
| | Polylactic-glycolic acid | ~200° C., cooled to RT when done. |
| | Coolmorph ® (nondisclosed ingredients) | 45° C., cooled to RT when done. |
| | Teflon | ~300° C., cooled to RT when done. |
| | Nylon | >150° C., cooled to RT when done. |
| | Polycarbonate | ~150° C., cooled to RT when done. |
| | Polyamide | >150° C., cooled to RT when done. |
| | Polystyrene | ~240° C., cooled to RT when done. |
| Inorganic Material | Gold | 1064° C. (m.p.) ± 200° C., cooled to RT when done. |
| | Silver | 962° C. (m.p.) ± 200° C., cooled to RT when done. |
| | Copper | 1085° C. (m.p.) ± 200° C., cooled to RT when done. |
| | Iron | 1538° C. (m.p.) ± 200° C., cooled to RT when done. |
| | Zinc | 420° C. (m.p.) ± 200° C., cooled to RT when done. |
| | Nickel | 1455° C. (m.p.) ± 200° C., cooled to RT when done. |
| | Cobalt | 1495° C. (m.p.) ± 200° C., cooled to RT when done. |
| | Manganese | 1246° C. (m.p.) ± 200° C., cooled to RT when done. |
| | Chromium | 1907° C. (m.p.) ± 200° C., cooled to RT when done. |
| | Titanium | 1668° C. (m.p.) ± 200° C., cooled to RT when done. |
| | Palladium | 1772° C. (m.p.) ± 200° C., cooled to RT when done. |

The sheath material for stretch-and-fold method is not limited to PCL, but may include any material that is capable of shaping the core compartment into a thin filament via the stretch and fold method, and is removable by solvent leaching, chemical erosion, or any type of treatment that leaves the core material intact.

The sheath can be formed by one material or by a mixture of materials from the following list. For precursor sheath made of a thermoplastic material, the precursor will be heated above the glass transition temperature of the sheath material(s), at which the precursor becomes plastic and deformable. Upon the end of stretch-and-fold procedure, the precursor will be rapidly cooled below the glass transition temperature and solidified, which arrests Rayleigh-Plateau instability and maintains the core's continuity.

For precursor sheath made of a pseudoplastic material, stretched and folded precursors may present non-Newtonian behaviors that prevent Rayleigh-Plateau instability and maintain the filament-shape of the core.

For precursor sheath made of an inorganic material, the precursor will be heated above the softening temperature of the material before stretching and folding, and cooled below the softening temperature after stretching and folding.

| Sheath Material Category | Material | Conditions for Stretch and Fold Procedure | Removal (Solvent or Erosion Chemical) |
|---|---|---|---|
| Thermoplastic | Polycaprolactone | ~65° C. | Acetone |
| | Coolmorph ® (non-disclosed ingredients) | ~45° C. | Acetone |
| | Acrylonitrile butadiene styrene | ~105° C. | Acetone |
| | Nylon | ~150° C. | Trifluoroacetic acid |
| | Polyetherether ketone | ~340° C. | 4-chlorophenol |
| | Polylactic acid | ~150° C. | Tetrahydrofuran |
| | Polybenzimidazole | >400° C. | Dimethylacetamide |
| | Polycarbonate | ~150° C. | Dimethylformamide |
| | Polyetherimide | ~200° C. | N-methylpyrrolidone |
| | Polyethylene | ~120° C. | Acetone |
| | Poly (methyl methacrylate) | 100 to 160° C. | Dimethylformamide |
| | | Dimethylformamide | |

| Sheath Material Category | Material | Conditions for Stretch and Fold Procedure | Removal (Solvent or Erosion Chemical) |
|---|---|---|---|
| | Polyethersulfone | ~200° C. | N-methylpyrrolidone |
| | Polyphenylene sulfide | ~220° C. | N-methylpyrrolidone |
| | Polystyrene | ~240° C. | Acetone |
| | Polyvinyl chloride | 100 to 260° C. | Tetrahydrofuran |
| | Polysulfone | ~190° C. | N-methylpyrrolidone |
| | Polyamide | >150° C. | Trifluoroacetic acid |
| | Polyacrylonitrile | ~320° C. | Dimethylformamide |
| | Polyethylene terephthalate | ~250° C. | Hexafluoro-2- |
| Pseudoplastic Compound | Sucrose (95~99% in water) | Room temperature ~60° C. | Water |
| | Clay (mixture of solid particles and water) | Room temperature ~60° C. | Water |
| | Polymer Clay (mixture of solid particles and polymers) | Room temperature ~60° C. | Tetrahydrofuran |
| | Gum base (mixture of solid particles and plastic polymers) | Room temperature ~60° C. | Tetrahydrofuran |
| Inorganic Material (Suitable for metallic cores) | Borosilicate | Softening point 740~990° C. | Hydrofluoric Acid |
| | Quartz | Softening point 1530~1720° C. | Hydrofluoric Acid |

Besides a ring, the precursor 100 can have any shape that can be stretched and folded, such as a rod or a plate (FIG. 7A).

The core 102 of the precursor 100 may have alternative cross-sections, such that the resulting micro/nanofibers may inherit different cross-sections (FIG. 7B). Possible geometries for the cross-sections include (but are not limited by) square, triangle, rectangle, semi circle, diamond, hexagon, pentagon, and octagon. The core materials can be divided into two or more compartments that contain different materials, such that the micro/nanofibers may become composite fibers (FIG. 7C). Materials in the compartments may be selected to promote charge-separation, redox reaction, and plasmon resonance, which may facilitate the functions of energy, electronics and optical devices. Possible geometries for the compartments include (but are not limited by) co-axis cylinders, co-axis polygon, bi-layered beam, and radially organized compartments.

The above embodiments were demonstrated by hand operations. However, an automatic system capable of conducting the stretching and folding cycles would be highly desirable for manufacturers, since the automatic system facilitates mass production and better provides repeatable results. An automatic system may also accelerate the thinning and elongation of core fiber, such that core-thinning and elongation may outpace the Rayleigh-Plateau instability, and maintain fiber continuity. The designs of two Stretch-and-Fold Machines 200, 300 are shown in FIGS. 8A-11B and described below.

This machine stretches and folds a pseudoplastic precursor repeatedly, and shapes the precursor into fibers. Here the precursor is shaped into a ring. This stretch-and-fold machine is described as below:

The machine 200 has three main components (FIGS. 8A-8C):

(1) A cone 202, which stretches the bulk-material ring by pushing the material down the slope of the cone 202.

Figure 8B:
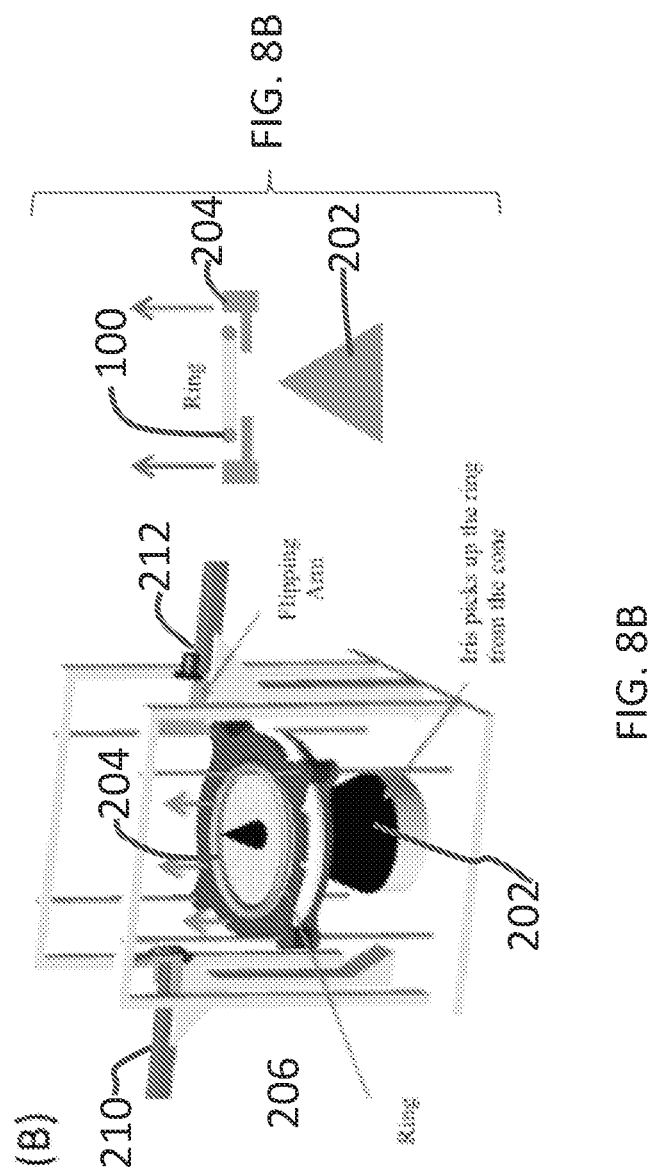
FIG. 8B is a schematic drawing showing a second step in a method of forming micro and nano fibers according to another exemplary embodiment of the present invention.

(2) A mechanical iris 204 is motorized to open/close its aperture 206 and also to move up/down, which enables the iris 204 to push the ring 100 down the cone 202 (FIG. 8A), lift the ring 100 up from the cone 202 (FIG. 8B), and transfer the ring 100 from the cone 202 to a pair of flipping arms 210, 212 (FIG. 8C).

(3) Flipping arms 210, 212 are designed to catch the ring 100 from the iris 204, fold the ring 100, and release the ring 100 back to the cone 202. One of the arms 210 moves linearly and rotates axially, and the other arm 212 moves linearly and bends up/down (FIG. 8C).

The stretch-and-fold machine 200 functions as follows:

Step 1: Load the Ring. The precursor ring 100 is positioned on the cone 202.

Step 2: Stretch the Ring. To stretch the ring 100, the iris 204 is positioned right above the ring 100 on the cone 202. The iris 204 moves down while opening the aperture 206 gradually, such that the diameter of aperture 206 matches the diameter of cone 202. The iris 204 pushes the ring 100 down the cone 202 by the edge of aperture 206, while stretching the ring 100 via the slope of cone 202 (FIG. 8A).

Step 3: Lift the Ring from the Cone. The following steps lift the ring 100 up from the cone 202. (a) The iris aperture 206 opens further and becomes wider than the stretched ring 100. (b) The iris 204 moves down, passing the ring 100. (c) The iris aperture 206 closes and become narrower than the ring 100. (d) The iris 204 moves up, lifting the ring 100 by the edge of aperture 206 (FIG. 8B).

Step 4: Transfer the Ring to the Flipping Arms. The following steps transfer the ring 100 from the iris 204 to the flipping arms 210, 212. (a) The arms 210, 212 approach each other and standby underneath the iris 204. (b) The iris 204 opens the aperture 206 and drops the ring 100 onto the flipping arms 210, 212 (FIG. 8C).

Step 5: Fold the Ring (FIG. 8C). (a) One flipping arm 212 rotates axially by 180 degrees (FIG. 8D), twisting the ring 100 into a double-ring, while dropping one side of the double ring 100 onto to the cone 202 (FIG. 8E). (b) The arms 210, 212 move another side of the double ring 100 to above the cone 202. The arm 210 that is holding the ring 100 bends downward and releases the side of the double-ring onto the cone 202 (FIG. 8F).

Repeat Step 2 to Step 5 until the desired core diameter is achieved (Each cycle doubles the length of the core 102, and decreases the diameter of the core 102 by $\sqrt{2}$ each time).

Figure 9A:
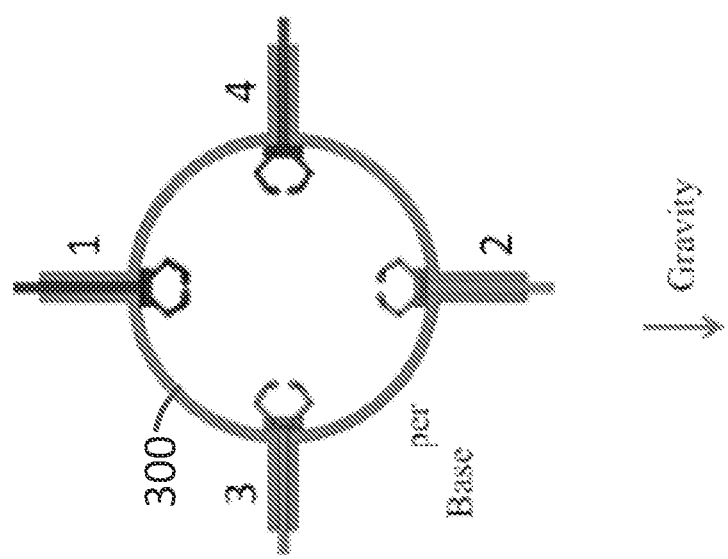
FIG. 9A is a schematic drawing showing a first step in a method of forming micro and nano fibers according to another exemplary embodiment of the present invention.

Stretch-and-Fold Machine 300 is shown in FIGS. 9A-9G. Similar the previous stretch-and-fold machine 200, this machine 300 stretches and folds a precursor repeatedly and turns the precursor into a fiber. However, here the precursor is shaped into a rod 150 instead of a ring. The stretch-and-fold machine 300 is described as follows:

The machine 300 has the following components (FIG. 9A).

(1) A gripper base 302. The base 302 supports four Grippers 1-4; each has a pair of gripping tips 304. The grippers 1-4 are positioned around the center of gripper base 302, by 90° angular spacing. Each gripper 1-4 faces toward the center. To help explanation, two opposing grippers are labeled "gripper 1" and "gripper 2". The other two opposing grippers are labeled "gripper 3" and "gripper 4". The grippers are motorized for three types of motions:

(i) Grasps or releases the precursor rod 150 by opening or closing the gripping tips 304.

(ii) Rotates axially.

(iii) Approaching or withdrawing from the center.

(2) A gripper base driver (not shown). The gripper base is motorized to rotate, such that opposing grippers (grippers 1 & 2 or grippers 3 & 4) are oriented to face a specific direction. This direction is either perpendicular to or in parallel with the direction of gravity.

The stretch-and-fold machine 300 operates as follows:

Step 1: Load the Rod 150. Gripper 1 and 2 grasp the precursor rod 150 by ends 152, 154. (FIG. 9B).

Step 2: Stretch the Rod 150. Gripper 1 and 2 stretch the rod 150 by withdrawing from each other (FIG. 9C).

Step 3: Fold the Rod 150. The gripper base re-orients gripper 1 and 2, so the rod 150 becomes horizontal. Grippers 1 and 2 approach each other and fold the rod 150 while the gravity assists folding (FIG. 9D).

Step 4: Transfer the Rod 150 from Grippers 1&2 to Grippers 3&4. Gripper 4 grasps the center 156 or rod 150 from below (FIG. 9E). The gripper base rotates Gripper 4 to the top, turning the rod 150 up side down (FIG. 9F). Gripper 1 and 2 release the rod 150, and gripper 3 grasps the rod 150 by the open ends 158, 159 from below.

Step 5: Twist the rod 150. Gripper 3 and 4 twist the rod 150 by axial rotation (FIG. 9G). Twisting helps maintain the round cross-section of the core.

Repeat Step 2 to Step 5: Repeatedly stretch, fold, transfer and twist the precursor rod 150, until the desired core diameter is obtained (Each cycle decreases the diameter of the core of rod 150 by $\sqrt{2}$ (=1.414) time).

Referring now to FIGS. 10A-10K, a machine 400 for stretching and folding precursor 100 and a method of using machine 400 is shown. The precursor 100 is shaped into rod 150. The stretch-and-fold machine 400 contains a mechanism to fold the rod 150 repeatedly, and this machine 400 resembles a machine for producing taffy. This machine 400, however, is significantly different from a taffy machine in two perspectives:

(1) Uniform Stretching: During each cycle, machine 400 stretches each section of the rod precursor 150 by a length ratio of 2.414 (=1+$\sqrt{2}$) and uniformly reduces the diameter of the core of the rod 150 by a ratio of 0.586 (=1/[(1/$\sqrt{2}$)+1]). In contrast, a traditional taffy machine stretches a candy rod by different stretching ratio for different segments, which forms a broad distribution of fiber diameters, and cannot use used to conduct the desired stretch-and-fold protocol.

(2) Buoyancy and Heating. To help stabilize the geometry of the rod precursor 150 during stretching and folding, the rod precursor 150 is submersed in a liquid of the equal density of the rod 150, such that the rod 150 may not be draped by gravity. Furthermore, to maintain the rod's plasticity, the liquid is heated and maintained at the melting temperature of the rod 150 (>65° C.). The liquid is a sucrose solution, prepared by mixing water and cane sugar at a weight ratio of 2:1. The sucrose solution is heated and maintained at 70° C. using an isothermal water bath.

Figure 10A:
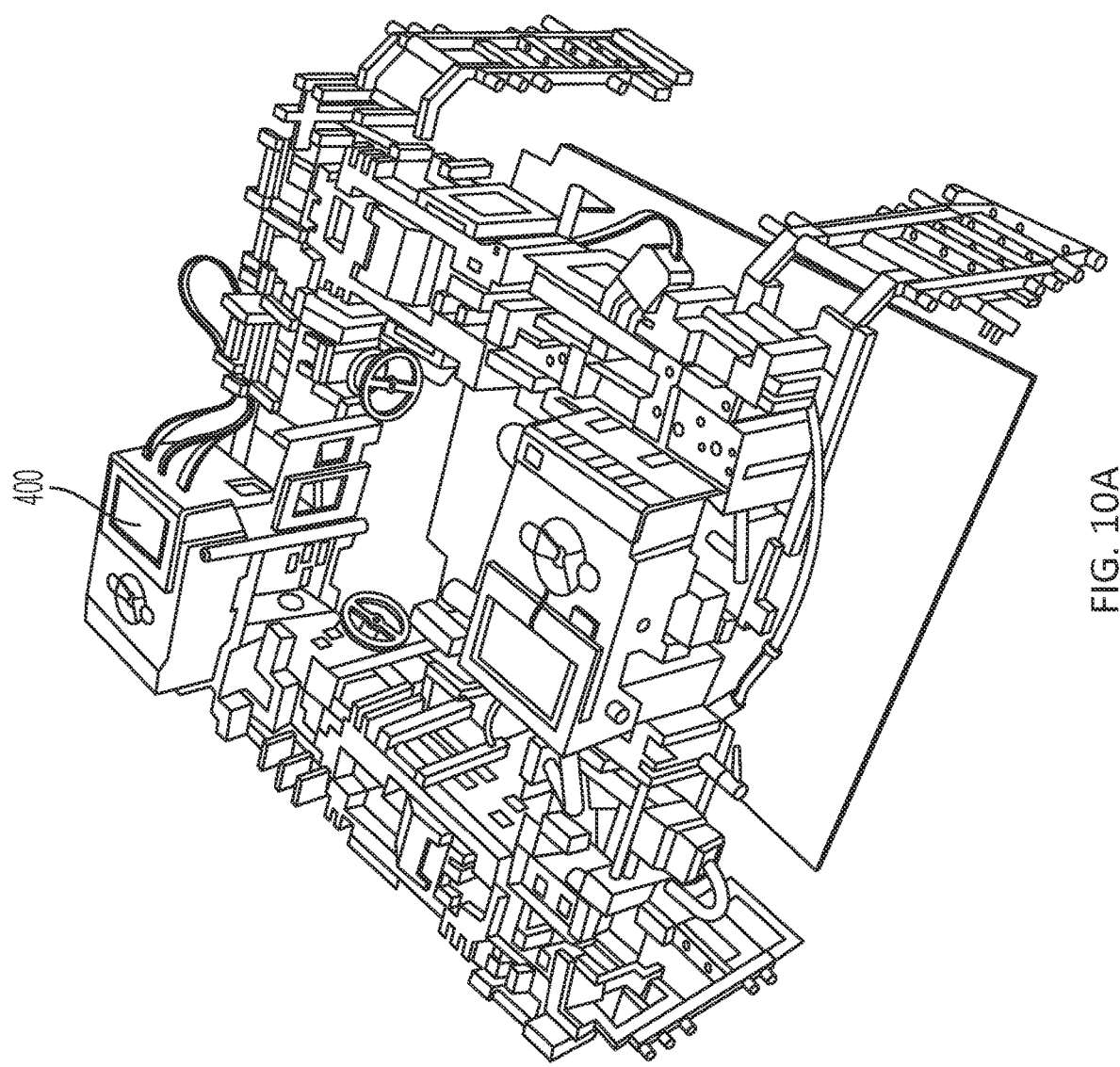
FIG. 10A is a photograph showing a machine used for forming micro and nano fibers according to another exemplary embodiment of the present invention.

The machine 400 has the following components (1) A gripper base 402 (FIGS. 10A-10B). The base 402 supports four grippers 1-4. The grippers 1-4 are positioned around the center of gripper base 402, by 90° angular spacing. Each gripper 1-4 is supported by an arm 410 extending toward the center. Each arm 410 is motorized and moves by two degrees of freedom. The rod precursor 150 is fixed to gripping tips 412 at the end of each arm 410, and the arms 410 perform the stretch-and-fold routine by the following motions: (a) Rotation about the z-axis. (b) Rotation about the axis of the arm 410. To help the following explanation, here two opposing grippers are labeled "gripper 1" and "gripper 2". The other pair are labeled "gripper 3" and "gripper 4".

Figure 10C:
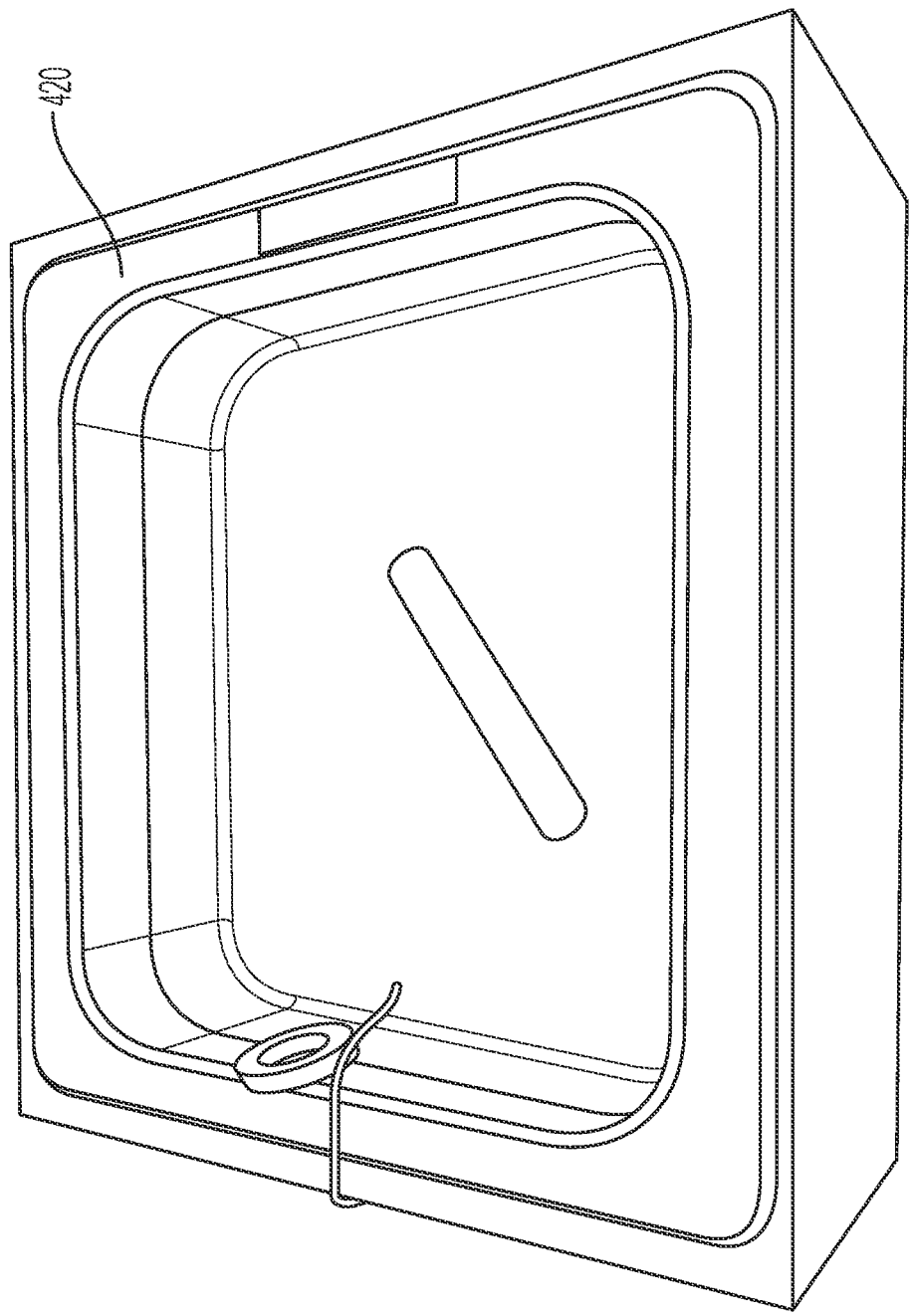
FIG. 10C is a photograph of a water bath used to provide buoyancy to counter the effect of gravity on the rod.

(2) An isothermal water bath 420 (FIG. 10C). The water bath 420 contains the above 70° C. sucrose water solution, and the grippers 1-4 are submersed in the sucrose solution, which maintain the temperature of the rod 150 above its melting point.

Figures 10D, 10E, 10F:
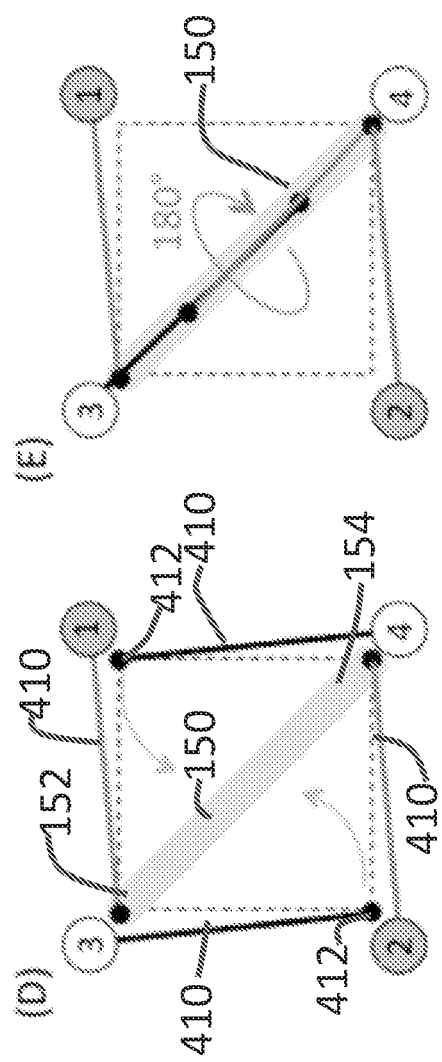
FIG. 10D is a schematic drawing showing twisting of a rod.
FIG. 10E is a schematic drawing showing twisting of the rod of FIG. 10D.
FIG. 10F is a schematic drawing showing twisting of the rod of FIG. 10D.

The stretch-and-fold machine 400 operates as follows:

Step 1: Load the Rod 150. Gripper 1 and 2 grasp the precursor rod 150 by ends 152, 154. (FIG. 10D).

Step 2: Twist the Rod 150. Following arm motions, Gripper 3 and Gripper 4 approach the mid section of the rod 150, such that Grippers 1, 2, 3 and 4 align with each other in a straight line and all grippers 1-4 grip rod 150. Afterward, Gripper 3 and Gripper 4 rotate about this straight line by 180 degrees, which twists the mid section of the rod 150 by 180 degrees while securing the rod 150 to Gripper 3 and Gripper 4 (FIG. 10E).

Figure 10H:
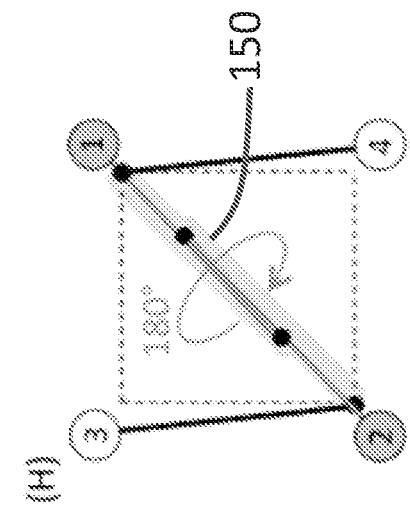
FIG. 10H is a schematic drawing showing folding and twisting of the rod of FIG. 10D.
Figure 10K:
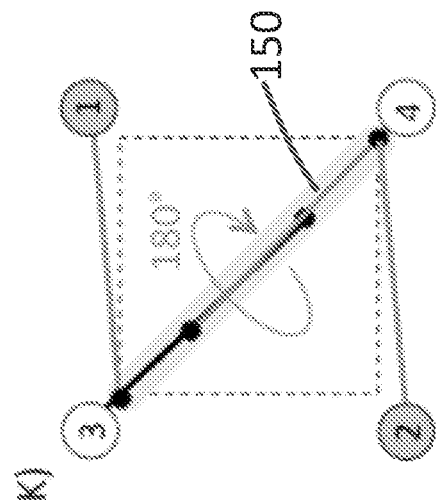
FIG. 10K is a schematic drawing showing folding and twisting of the rod of FIG. 10D.
Figure 10J:
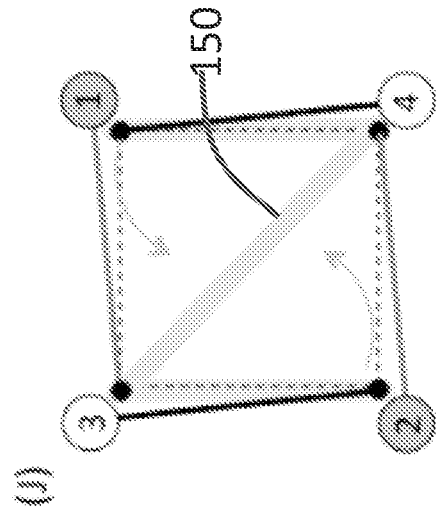
FIG. 10J is a schematic drawing showing stretching of the rod of FIG. 10D.
Figure 10G:
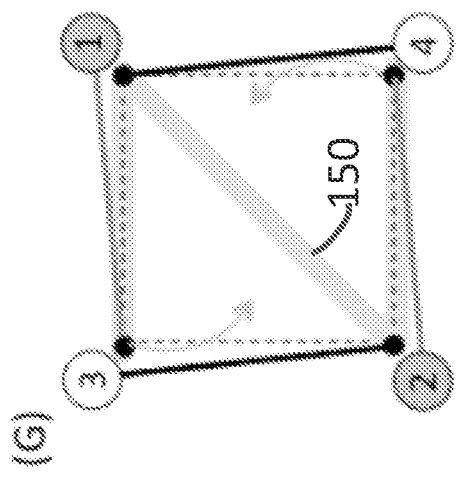
FIG. 10G is a schematic drawing showing stretching of the rod of FIG. 10D.

Step 3: Stretch the Rod 150. Grippers 3 and Gripper 4 return to their original position. This motion pulls the rod into a "Z" shape, extending the overall length of the rod 150 by 2.414 (=1+$\sqrt{2}$) folds, and decreases the diameter of the precursor core (which forms the fibers) by a ratio of 0.586 (=1/[(1/$\sqrt{2}$)+1]). (FIG. 10F to 10G).

Figure 10I:
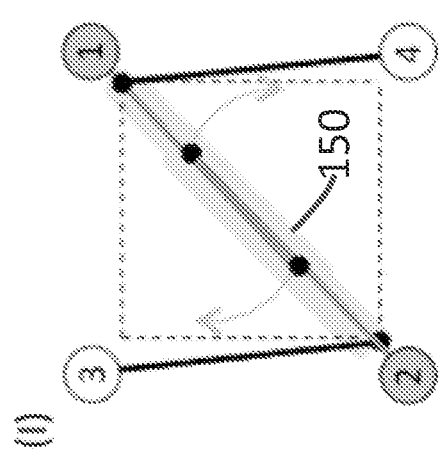
FIG. 10I is a schematic drawing showing folding twisting of the rod of FIG. 10D.
Figure 11A:
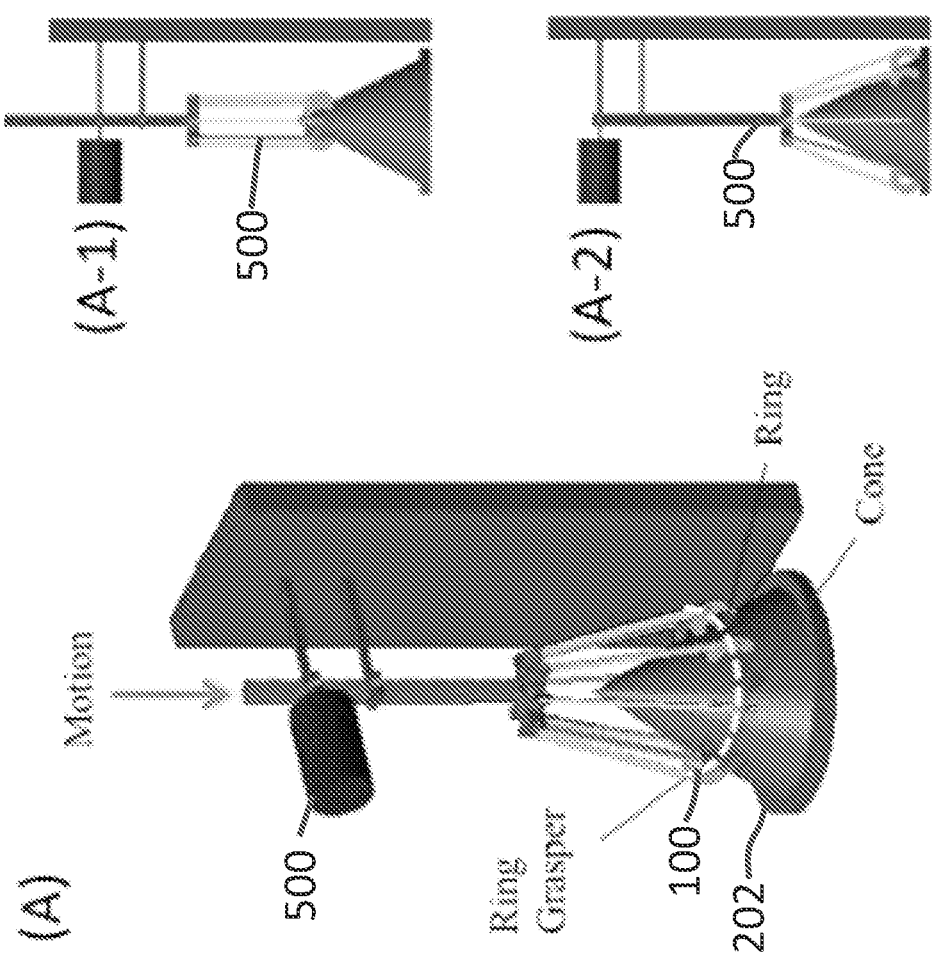
FIG. 11A is a schematic drawing showing a method of forming micro and nano fibers according to another exemplary embodiment of the present invention.

Step 4: Fold and Twist the Rod 150. Gripper 1 and Gripper 2 approach the mid section of the rod 150, such that Grippers 1, 2, 3 and 4 align with each other in a straight line and all grippers 1-4 grip rod 150. This motion folds the rod 150, while turning the shape of the precursor from "Z" shape back to a rod shape. Afterward, Gripper 1 and Gripper 2 rotate about this straight line by 180 degrees, which twists the mid section of the rod by 180 degrees while securing the rod to Gripper 1 and Gripper 2 (FIG. 10G to 10I).

Step 4: Stretch the Rod 150 Again. Grippers 1 and Gripper 2 return to their original position. This motion pulls the rod 150 into a "Z" shape and extends the overall length of the rod by 2.414 (=1+$\sqrt{2}$) folds, and decreases the diameter of the precursor core (which forms the fibers) by a ratio of 0.586 (=1/[(1/$\sqrt{2}$)+1]) (FIGS. 10I to 10J).

Step 5: Fold and Twist the Rod 150 Again. Gripper 3 and Gripper 4 approach the mid section of the rod 150, such that Grippers 1, 2, 3 and 4 align with each other in a straight line and all grippers 1-4 grip rod 150. This motion folds the rod, while turning the shape of the precursor from "Z" shape back to a rod shape. Afterward, Gripper 3 and Gripper 3 rotate about this straight line by 180 degrees, which twists the mid section of the rod 150 by 180 degrees while securing the rod to Gripper 3 and Gripper 4 (FIG. 10J to 10K, then back to 10F).

Repeat Step 3 to Step 5: Repeatedly stretch, fold, and twist the rod 150 precursor until the desired core diameter is obtained.

The above machines 300-400 are examples for the automation of Stretch-and-Fold method. However, these examples should not be used to limit the scope of this automatic system. For example, the iris 202 for stretching a ring-shaped precursor 100 can be replaced by the umbrella-like mechanisms in machine 500 in FIGS. 11A-11B.

The nature of the automatic system is therefore much broader than the above embodiments, and should be based on the following description:

(1) An automatic machine 500 to stretch and fold a precursor 100 made of a bulk material, which has a specific shape, and to transform the bulk material into a filament, the filament diameter is adjustable from 10 nanometers to 1 millimeter. The machine 500 performs the following functions:
  a. A stretching function, which elongates and thins the precursor 100.
  b. A folding function, which folds the precursor 100.
  c. A transferring function, which transfers the precursor 100 between the stretching function and the folding function.

(2) In (1), the precursor 100 has an initial shape of a ring, a cylinder, an ellipsoid, a sphere, a cube, a cuboid, a cone, a hemisphere, a polygonal prism such as triangular prism, rectangular prism, pentagonal prism, or hexagonal prism, or a polygonal pyramid such as triangle based pyramid, square based pyramid, pentagon based pyramid, or hexagon based pyramid.

(3) In (1), the precursor 100 contains core 102 and sheath 104 as described above. The sheath 104 keeps the core 102 separated during the folding and stretching, and is removable for releasing the core 102. The core 102 has an initial shape of a ring, a cylinder, an ellipsoid, a sphere, a cube, a cuboid, a cone, a hemisphere, a polygonal prism such as triangular prism, rectangular prism, pentagonal prism, or hexagonal prism, or a polygonal pyramid such as triangle based pyramid, square based pyramid, pentagon based pyramid, or hexagon based pyramid.

(4) In (3), the sheath 104 can be removed by a solvent, such that the core 102 after stretching and folding is releasable by solvent leaching.

(5) In (1), the stretching function is performed by a stretching module. The stretching module contains a motor and at least one holder, in which the motor actuates the holder to stretch the precursor.

(6) In (5), the holder contains a cone 202 and a mechanical iris 204. The iris 204 pushes the precursor 100 along the cone 202, thereby stretching the precursor 100 by the slope of the cone 202.

(7) In (5), the holder contains a pair of grippers 1, 2 holding the precursors 150. The grippers 1, 2 stretch the precursor 150 by withdrawing from each other.

(8) In (1), the folding function is performed by a folding module that contains one motor and at least one gripper. The motor actuates the gripper to fold the bulk material.

(9) In (8), the folding module includes a hanger and a pair of grippers holding the precursor 150. The grippers 110, 112 fold the precursor 150 by twisting the precursor 150 on the hanger, which supports the precursor 150.

(10) In (9), the hanger is a cone 202, and the precursor 100 is ring-shaped.

(11) In (8), the folding module includes a pair of grippers 1, 2 holding the precursor 150. The grippers 1, 2 fold the precursor 150 by approaching each other.

(12) In (1), the stretching function is performed by a cone 202 and a mechanical iris 204. The iris 204 pushes the precursor 100 along the cone 202, thereby stretching the precursor 100 by the slope of the cone 202; the folding function is performed by a pair of grippers 110, 112 holding the precursor 100, the grippers 110, 112 fold the precursor 100 by twisting the precursor 100 upon the cone 202; the transferring function is performed by the cone 202 and iris 204; the cone 202 supports the precursor 100 upon stretching and after folding; the iris 204 lifts the precursor 100 from the cone 202 after stretching, and releases the precursor 100 to the grippers 110, 112 before folding.

(13) In (1), the stretching and folding function are performed by a pair of first grippers 1, 2 holding the precursor 150; the first grippers 1, 2 stretch the precursor 150 by withdrawing from each other, and fold the precursor 150 by approaching each other; the transferring function is performed by a pair of second grippers 3, 4; the second grippers 3, 4 grasp the precursor 150 from the first grippers 1, 2 after folding. The functions of the first and second grippers 1, 2, and 3, 4 swap after each stretching and folding cycle.

(14) In (1) the system includes a thermal module 420. The module 420 maintains the precursor's temperature above a plastic temperature, at which the precursor 150 becomes plastic.

The stretch-and-fold technology described herein has shown the following advantages for mass-production:

Arrested Rayleigh Instability. Made of a high molecular weight thermoplastic, the sheath 104 provides high viscosity in the melted phase ($u > 1 \times 10^6$ cP-s). This delays the Rayleigh instability and maintains the gelatin core 102 by minutes beyond the stretch/fold cycles. The Rayleigh instability is arrested by cooling the sheath 104 to the solid phase after the stretching and folding.

Figure 12:
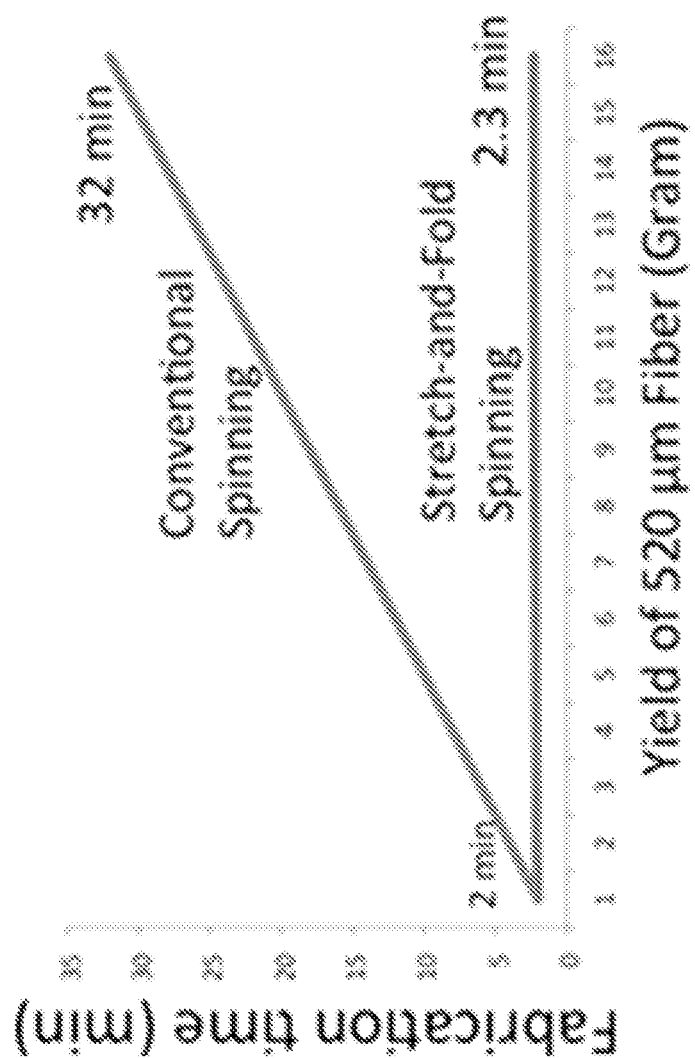
FIG. 12 is a graph comparing yield vs. fabrication time of conventional spinning and the inventive method.

High Production Rate and Easily Tunable Diameter. Following the power law, the number of microfibers (n) increases exponentially with the number of stretch/fold cycles ($n=2^N$), while the fiber diameter decreases exponentially with the cycles ($D=D_0/2^{0.5N}$), which enables an easy customization of fiber diameter. In experiments, the smallest diameter achieved was about 200 nm. The production rate of microfibers was constantly high regardless of the change in diameter and the total weight of the microfibers. For example, after 25 stretch/fold cycles and 2 min, a 1-gram gelatin core of 3 mm initial diameter was turned into a bundle of 33,554,432 microfibers of 0.52±0.08 µm (=520±80 nm) diameter. Increasing the yield of the 520 nm microfibers by 16-fold spent four extra cycles, or 0.5 other minutes. In contrast, the fabrication time of the conventional fibers spinning often linearly increases with the yield. See the graph of FIG. 12.

The success of stretch-and-fold method relies on the delay of Rayleigh instability. Increasing the number of stretch-and-fold cycles unlimitedly will eventually induce instability, breaking the core biopolymers into micro/nano-beads. However, the inventors have discovered that the instability could be out-paced, and microfibers 520 nm in diameter can be produced from gelatin via 25 stretch-and-fold cycles when the following conditions are met:

(1) High-molecular-weight (~50,000 Da) polycaprolactone for the thermoplastic sheath.

(2) 300-boom porcine gelatin for the core polymer.

(3) Conduct the process at a lower temperature slightly above the melting point of the sheath (~60 degrees C.).

(4) Complete all cycles in 3 min. Cool the sheath material to room temperature, solidifying the sheath The achievable minimum diameter became 15-20 µm when the overall cycling time became 20 minutes. The minimum diameter became 1-2 µm when the temperature was raised to 80 degrees C. The minimum diameter became 2-4 µm when using a sheath polymer of lower molecular weight (about 10,000 Da).

The arrest of Rayleigh Instability can be modeled mathematically. The core of polymer solution was modeled, which is in a bundle of identical cores of polymer solution, as a cylinder of a viscous liquid surrounded by a cylindrical sheath made of another viscous liquid. The core cylinder has a radius of a, and the sheath cylinder has an external radius of b. Assuming that the fluid flow is symmetric about the central axis of the core cylinder, the dynamics equations of the liquids of viscosity µ and density ρ, respectively, are:

$$\rho\left(\frac{\partial u}{\partial t}+u\frac{\partial u}{\partial r}+w\frac{\partial u}{\partial z}\right)=-\frac{\partial p}{\partial r}+\mu\left(\frac{\partial^2 u}{\partial r^2}+\frac{1}{r}\frac{\partial u}{\partial r}-\frac{u}{r^2}+\frac{\partial^2 u}{\partial z^2}\right)$$
$$\rho\left(\frac{\partial w}{\partial t}+u\frac{\partial w}{\partial r}+w\frac{\partial w}{\partial z}\right)=-\frac{\partial p}{\partial z}+\mu\left(\frac{\partial^2 w}{\partial r^2}+\frac{1}{r}\frac{\partial w}{\partial r}+\frac{\partial^2 w}{\partial z^2}\right)$$
Equation 1

$$u=\frac{1}{r}\frac{\partial \psi}{\partial z},\quad w=-\frac{1}{r}\frac{\partial \psi}{\partial r}$$
Equation 2 where w and u are the axial and radial component of the fluid velocity. Equation 1 is based on the requirement of momentum conservation. Equation 2 yields the fluid velocity w and u via the Stokes stream function $\psi$, which automatically satisfies the requirement of mass continuity. Under a disturbance with a spatial wavelength $\lambda=2n/k$, the function $\psi$ becomes:

$$\Psi=\phi(r,z)e^{i(nt+kz)}$$
Equation 3 and has the general solution as below:

$$\Psi=[A_1 rI_1(kr)+B_1 rK_1(kr)+A_2 rI_1(k_1 r)+B_2 rK_1(k_1 r)]e^{i(nt+kz)},$$
Equation 4
$$\text{where } k_1=\sqrt{k^2+\frac{in\rho}{\mu}}$$

In which $I_x$ and $K_x$ are the modified Bessel functions of the first and second kind. The value of n is a function of k and determines the instability of the liquids; if the value of i*n is real and positive, the core cylinder will become varicose and dissociate over time. Therefore, the k producing the maximum i*n value determines the most likely spatial periodicity by which the fluid cylinder will break apart. The coefficients $A_{1,2}$ and $B_{1,2}$ for the stream function w are calculated by the boundary conditions.

The boundary conditions are defined as follows:
(i) The flow velocity is finite at the center of the core.
(ii) There is no slipping at the interface of the core and sheath flow.
(iii) The tangential stress parallel to the interface of the core and sheath flow is continuous.
(iv) The difference in the normal stress between the inside and outside of the core equals the interfacial surface tension between the core and sheath liquids.
(v) The flow velocity at the external boundary is zero.

Figure 13:
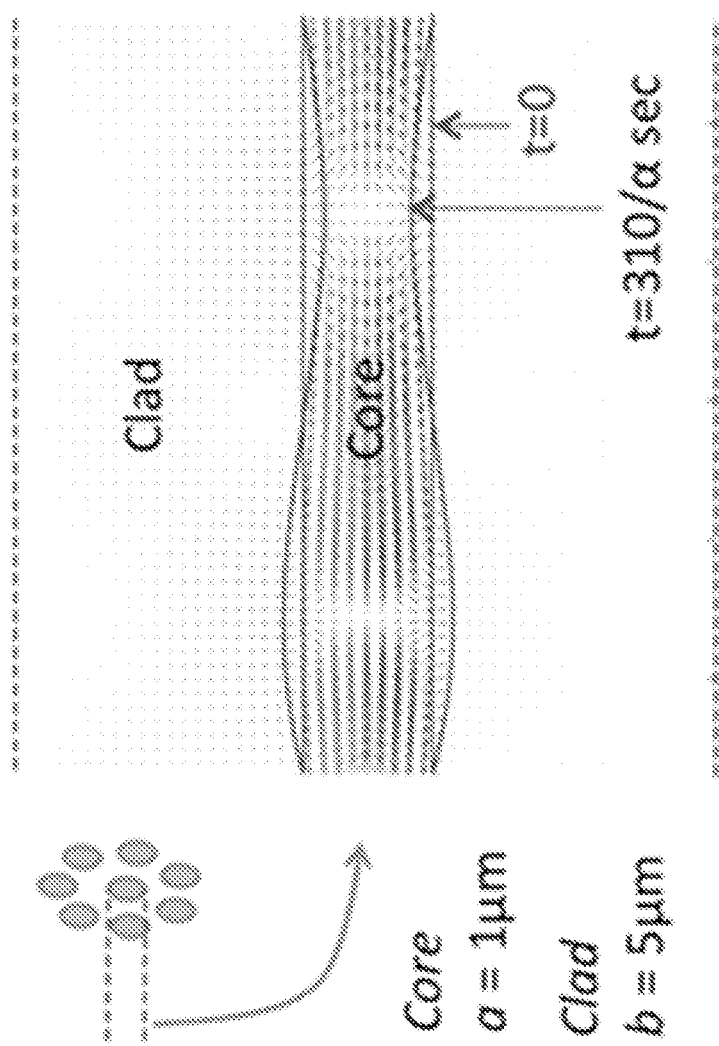
FIG. 13 is a schematic model of a gelatin core at $310/\alpha$ seconds, where a represents the strength of instability and was estimated to be 0.74 according to experimental data.

In (v), it is assumed that there is negligible flow at the external boundary of the sheath, due to the extremely high viscosity of the sheath liquid, and also due to the hindrance by the surrounding sheath cylinder, as shown in FIG. 13. The boundary conditions (i) leads to $B'_1=B'_2=0$ since $K_x$ is infinite at r=0. The rest of the boundary conditions lead to a complex 6-by-6 linear equation:

$$M(k,n)[A_1 A_2 B_1 B_2 A_1' A_1']^T=0$$
Equation 5

Where M(k,n) is a square matrix with 6-by-6 functions of k and n. The existence of non-zero (non-trivial) solution for $\psi$ demands a zero determinant of M and therefore the relation between k and n:

$$|M(k,n)|=0$$
Equation 6

The stream function $\psi$ and thus the fluid flows was solved using the equations (6), (5), (4) and (2). The above theoretical modeling enables the prediction of how long a core of fiber will maintain cylindrical, and most importantly, how thin the fibers can become under certain fabrication conditions. Such knowledge can accelerate the design and manufacturing of biopolymer microfibers of different diameters and polymer properties.

Experiment: How Cell-scale 3D Topography Affects Mesenchymal Stem Cell Mechanotransduction.

In 2D models, cell-scale topography is known for regulating mechanotransduction and the cell sensing of matrix elasticity. However, whether or how this phenomenon takes place in 3D is unclear. The goal of this experiment was to answer this question by conducting a comprehensive experimental study. Of particular focus were the combinatory effects of porosity, and matrix anisotropicity on the stem cells differentiation of stem cells. The crosslinkable microfibers, mass-produced by the stretch-and-fold method, were used as the building blocks to customize pore size and matrix anisotropicity by changing the diameter and alignment of microfibers, respectively. Although stem cells also respond to biopolymer type, to focus on the effects of biophysical factors, all microfibers for our experiment was fabricated by gelatin, which is a standard biopolymer for cells culturing.

Figure 14E:
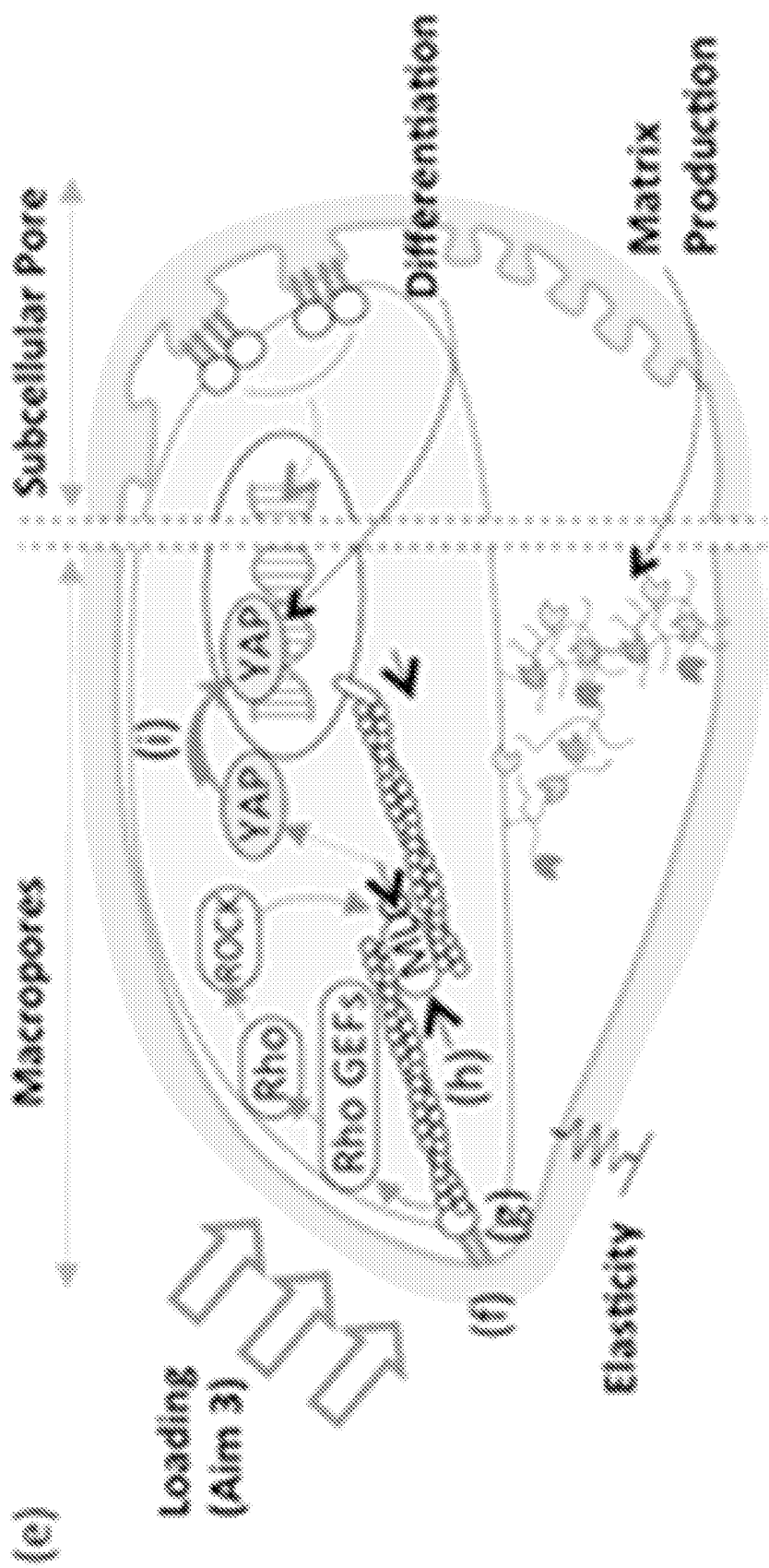
FIG. 14E is a schematic drawing of cytoskeleton-derived mechanotransduction.

Cytoskeleton-based Mechanotransduction. Mechanotransduction in response to matrix elasticity and topography involves the chain reactions (or signaling pathways) among the matrix-binding proteins, e.g. integrin (FIG. 14e at f), the focal-adhesion proteins assembly (FIG. 14e at g), and the cytoskeletons between the matrix-binding proteins and the cell nuclei (FIG. 14e at h). The cytoskeletons generate tension and induce conformational change to the associated proteins, e.g. vinculin, which exposes hidden molecules binding-sites in the proteins, which in turn feedback to the focal adhesion assembly, which increases the cytoskeletons and forms stress fibers that produce the maximum tension and change the cell shape. In 2D, the above pathway is hindered when the reorganization of cytoskeletons is inhibited, either by an extremely soft matrix (<10 kPa), which does not maintain cell tension, or by a very narrow space that confines the cell shape and the cellular tension. The cell-sized microfibers created by the inventive stretch-and-folding methods can be applied to controlling the mechanosensing of cells in two ways. The first way is by tuning the spatial confinement of cells by selecting the fiber diameter (FIG. 7b,d). The second way is by tuning the elongation of cells by controlling the alignment of microfibers (FIG. 7a,c). In general, thicker fibers form bigger pores and less cell confinement, while thinner fibers form smaller pores and more cell confinement. Aligned fibers often lead to elongated cell morphology, while randomized fibers promote randomly spread cell shapes.

Role of Yes Associated Proteins (YAP) in the Mechanotransduction

Through unidentified mechanisms, the activation of the above signaling network activates the expression of some genes and inhibits the others, while activating the Yes Associated Protein (YAP) (FIG. 14e at i). The YAP is a gene transcription cofactor that is involved in stem cell proliferation and differentiation into certain types of cells, such as bone cells (osteogenesis). The activated YAP proteins accumulate inside the cell nuclei, whereas the YAP proteins that are de-activated are confined to the cytosol, which happens when the above signaling pathway is off. Therefore, the average location of YAP in the cells can be used to monitor the activation of mechanotransduction of stem cells. It has been shown that the activating YAP activates fibroblast and induces scarring, while the deactivating YAP stabilizes the gene expression of chondrocytes, which are cell types close to the meniscus cells.

Preparing Microfibers. Crosslinkable microfibers of varying diameter (0.5 μm 50 μm) were fabricated using the stretch-and-fold protocols.

Preparing MSC. Human MSC were purchased at passage-2. The cells were counted and seeded onto tissue culture flasks with Dulbecco's modified Eagle medium (DMEM), containing fetal bovine serum (FBS) (10%) and antibiotic penicillin/streptomycin (P/S) solution (1%). Following the initial 48 hr of incubation at 37° C. and 5% $CO_2$, cells were washed with PBS and expanded in DMEM with 10% FBS, 1% P/S and 10 ng/mL basic fibroblast growth factor. The cells were passaged upon 85-90% confluence and passage-5 cells will be used for all experiments.

Fabricate Cellularized Scaffolds of Customized Pore Sizes and Anisotropicity. Microfibers were rehydrated by 10 wt % density. To prepare anisotropic scaffolds, aligned microfibers were gently fold-mixed with MSC to reach 5 million/mL uniform cell density, while keeping the direction of folding perpendicular to the fiber alignment. The microfibers were molded, photo-crosslinked into 2 mm thick scaffolds and incubated in the MSC culture medium. To prepare isotropic scaffolds, the above procedure was repeated using randomized microfibers without alignment. Cell viability was examined after 48 hr with live/dead reagents (Thermo Fisher). The porosity of microfibers was tuned between 2 μm and 200 μm by the selected of microfiber diameters (0.5 μm 50 μm). The morphology of resulting scaffolds was evaluated using SEM.

Analyze the Mechanosensing of Stem Cells. The results, shown in FIG. 15, demonstrated that pore-size and anisotropicity significantly impact the cell morphology. Samples were harvested 14 days post-cultured and were fixed and cryo-sectioned. All samples were immunostained for YAP and the cytoskeleton components including vinculin, α-tubulin, and phosphorylated focal adhesion kinase (pFAK), followed by counter-staining for the stress fibers (phalloidin) and cell nuclei. The immunostained samples were imaged in 3D by confocal microscopy. Image processing was performed using program ImageJ (National institute of Health). 3D cell structures were reconstructed from confocal image stacks, and the cell morphology was be characterized by cell length, aspect ratio, volume, and cell-cell alignment (FIGS. 15a-h). Cell tension was be estimated by the distribution and signal intensity of vinculin, pFAK, and stress-fibers. The status of mechanotransduction was characterized by the distribution of YAP inside or outside the cell nuclei (FIG. 15i.). Correlation among scaffold properties and cell properties was analyzed by using Excel and MATLAB programming.

MSC encapsulated among thin fibers (which gave subcellular size pores) had round morphology and significantly lower amount of YAP presented in the cell nuclei (FIGS. 15a, 15b). In contrast, MSC encapsulated among the thick fibers (which gave pores larger than the cells) had widespreading morphology and significantly higher amount of YAP presented in the cell nuclei (FIGS. 15c, 15d). Interestingly, when the thin fibers were used but aligned into a linear formation, the YAP in the MSC nuclei became significantly higher than the MSC among the thin fibers that were randomized (FIGS. 15e, 15f vs. 15, 15b). The results demonstrated that the alignment and diameter of the stretched-and-folded fibers significantly impacted the mechanosensing of stem cells, which makes these fibers highly promising for the clinical applications where the stem cells' fate needed to be controlled.

While the above-described methods for forming microfibers and nano-fibers are performed using machinery, those skilled in the art will recognize that at least some of the methods described above can be performed manually, in the absence of any machinery.

It will be further understood that various changes in the details, materials, and arrangements of the parts which have been described and illustrated in order to explain the nature of this invention may be made by those skilled in the art without departing from the scope of the invention as expressed in the following claims.

The invention claimed is:

1. A method for producing microfibers comprising the steps of:
    (a) providing a base material;
    (b) forming the base material in a ring;
    (c) gripping opposing ends of the ring;
    (d) flipping one of the opposing ends relative to the other of the opposing ends, forming an upper portion and a lower portion;
    (e) folding the upper portion onto the lower portion;
    (f) stretching the folded upper and lower portions; and
    (g) repeating steps (d)-(f) as desired.

2. The method according to claim 1, wherein steps (d)-(f) are performed sufficient times to form fibers with submicron diameter.

3. The method according to claim 1, wherein step (a) comprises providing a protein-based base material.

4. The method according to claim 1, wherein step (a) comprises providing a sheath around the base material.

5. The method according to claim 4, wherein the method further comprises the step of:
    (h) dissolving the sheath.

6. The method according to claim 1, wherein the method is performed manually.

7. The method according to claim 1, wherein the method is performed automatically.

8. The method according to claim 7, wherein the method comprises providing a machine, wherein the machine performs steps (c)-(g).

9. The method according to claim 8, wherein step (f) comprises forcing the folded upper and lower portions onto a cone.

10. The method according to claim 8, wherein step (f) comprises placing the folded upper and lower portions around a frame and expanding the frame.

11. The method according to claim 10, wherein the frame comprises a plurality of radially expanding posts.

12. The method according to claim 10, wherein the frame comprises a radially expanding bladder.

* * * * *